United States Patent
Yap

(10) Patent No.: US 7,394,817 B2
(45) Date of Patent: Jul. 1, 2008

(54) DISTRIBUTED DATA CACHING IN HYBRID PEER-TO-PEER SYSTEMS

(75) Inventor: Sim Thong Yap, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/901,140

(22) Filed: Jul. 29, 2004

(65) Prior Publication Data

US 2005/0044147 A1   Feb. 24, 2005

(30) Foreign Application Priority Data

Jul. 30, 2003   (AU)   .............................. 2003903967

(51) Int. Cl.
*H04L 12/56* (2006.01)

(52) U.S. Cl. .................. 370/400; 709/201; 711/117; 711/143; 711/173

(58) Field of Classification Search .................. 370/229, 370/232, 235, 252; 709/201; 711/117, 122, 711/147, 173
See application file for complete search history.

(56) References Cited

U.S. PATENT DOCUMENTS

| | | | | |
|---|---|---|---|---|
| 6,009,427 | A | 12/1999 | Wolff | 707/10 |
| 6,035,323 | A | 3/2000 | Narayen et al. | 709/201 |
| 6,330,572 | B1 | 12/2001 | Sitka | 707/205 |
| 6,973,536 | B1 * | 12/2005 | Jacobs et al. | 711/119 |
| 2002/0016891 | A1 * | 2/2002 | Noel et al. | 711/153 |
| 2002/0029277 | A1 | 3/2002 | Simpson-Young et al. | 709/228 |
| 2002/0065919 | A1 * | 5/2002 | Taylor et al. | 709/226 |
| 2002/0069334 | A1 * | 6/2002 | Hsia et al. | 711/147 |
| 2002/0198877 | A1 * | 12/2002 | Wolff et al. | 707/6 |
| 2003/0023826 | A1 * | 1/2003 | McMichael et al. | 711/173 |
| 2003/0037010 | A1 * | 2/2003 | Schmelzer | 705/67 |
| 2003/0050834 | A1 * | 3/2003 | Caplan | 705/14 |
| 2003/0074322 | A1 * | 4/2003 | Wu | 705/57 |
| 2003/0131044 | A1 * | 7/2003 | Nagendra et al. | 709/201 |
| 2003/0195938 | A1 * | 10/2003 | Howard et al. | 709/208 |
| 2004/0025052 | A1 * | 2/2004 | Dickenson | 713/201 |
| 2004/0235489 | A1 * | 11/2004 | Kwon | 455/452.2 |
| 2005/0050292 | A1 * | 3/2005 | Oh | 711/170 |
| 2005/0120133 | A1 * | 6/2005 | Slack-Smith | 709/234 |
| 2005/0267901 | A1 * | 12/2005 | Irlen | 707/100 |
| 2006/0031558 | A1 * | 2/2006 | Ortega et al. | 709/232 |
| 2007/0008927 | A1 * | 1/2007 | Herz et al. | 370/331 |
| 2007/0143375 | A1 * | 6/2007 | Tom et al. | 707/204 |

* cited by examiner

*Primary Examiner*—Huy D. Vu
*Assistant Examiner*—Abdullah Riyami
(74) *Attorney, Agent, or Firm*—Fitzpatrick, Cella, Harper & Scinto

(57) ABSTRACT

A method for caching data in a hybrid peer-to-peer system comprising a plurality of interconnected peer computers is disclosed. The method comprising the steps of establishing (1702) a performance criterion, arranging (1703) the hybrid peer-to-peer system as a plurality of interconnected hierarchical groups of peers by assigning each of the plurality of peers to at least one group as a first function of the performance criterion, and processing (1704) the data into a plurality of hierarchical data partitions. The method thereafter allocates (1705), as a second function of the performance criterion, each said data partition to at least one of the groups, and caches (1706) each said data partition in at least one peer in the corresponding group.

18 Claims, 15 Drawing Sheets

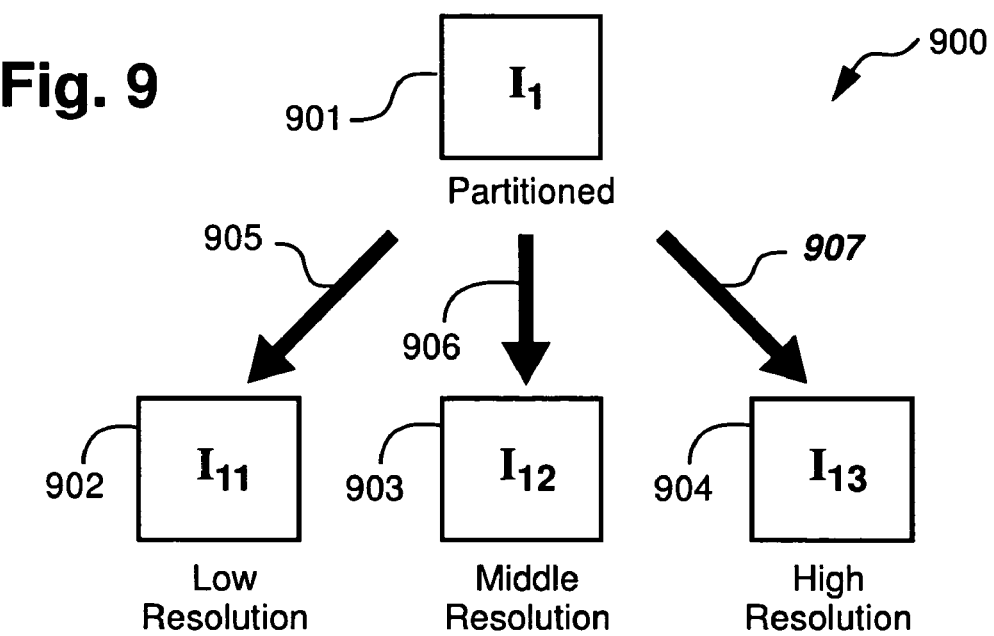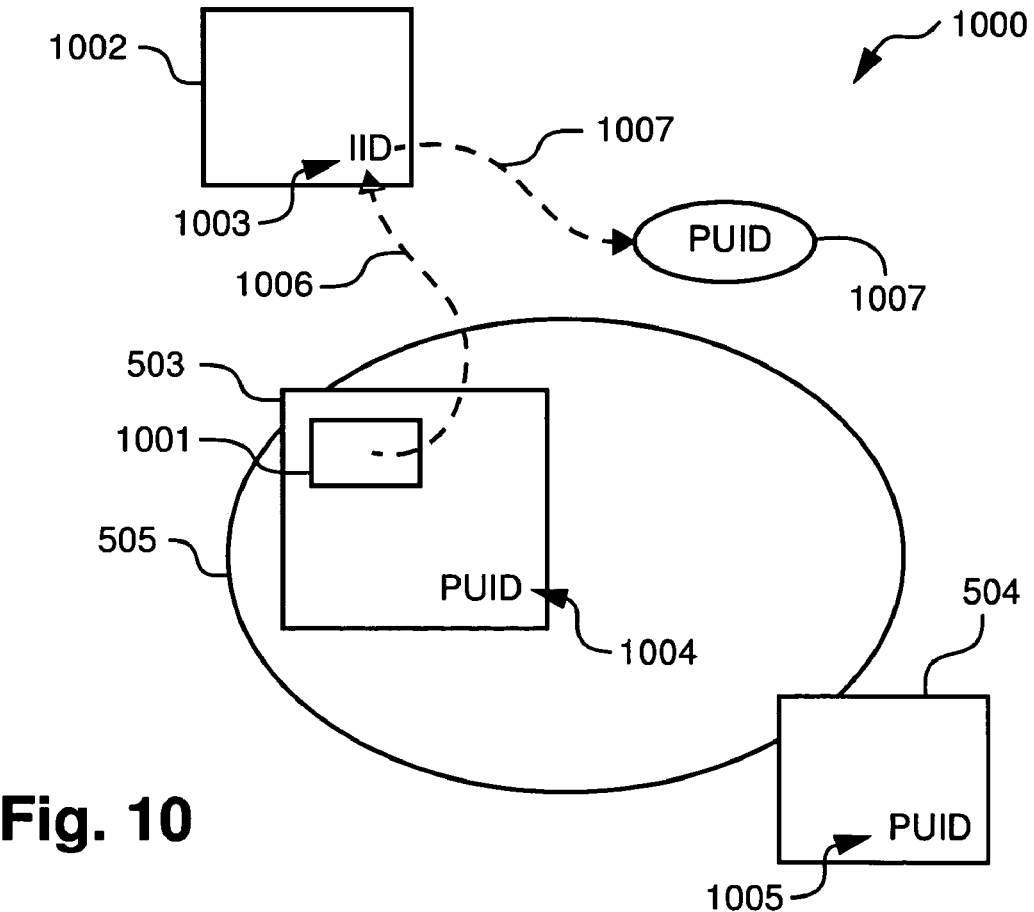

DISTRIBUTED DATA CACHING IN HYBRID PEER-TO-PEER SYSTEMS

FIELD OF THE INVENTION

This invention relates to distributed caching techniques and in particular to a distributed caching technique for use in hybrid peer-to-peer computer systems.

BACKGROUND

In general, there are at least two models for exchanging data among a set of interconnected computers. One such model is termed the "client and server" model. In this model, client machines send their requests to the server machine, which has a well-known address. The clients wait for a response from the server, and down-load the requested data. The server is often maintained as a publisher of data and typically has a relatively large bandwidth connection to a relevant network, as well as significant processing power and storage capacity. The server is generally responsible for indexing, locating, retrieving, storing, caching and securing the data. The server also ensures data integrity and enforces an access policy on the data.

The clients in a client/server arrangement typically contain very simple and limited logic. The primary responsibility of clients is to initiate and complete "transactions" with the server. The clients are thus often pure consumers of data "published" by the server. Users who wish to "publish" data must up-load their data to a server.

An alternative arrangement is a fully distributed and decentralised model that is known as the "peer-to-peer" model. In this model, the computers/nodes that are connected together are referred to as peers. All peer machines are conceptually equal, and there are no peers with special administrative roles. The peers are generally organised in a flat (i.e. non-hierarchical) structure and connections are formed in an ad-hoc manner. Any peer can "publish" data to, and "consume" data from, any other peer. The autonomous peers in such arrangements are typically considerably more complex than the clients in a client and server system, and often come in a variety of hardware and software configurations.

A further configuration is known as the hybrid peer-to-peer model, which attempts to embody the advantages of both the above-mentioned models. The hybrid peer-to-peer model is quasi-decentralised and is often characterised by one or more of (a) the presence of some hierarchical structure, (b) special peers or (c) servers. There are many flavours of hybrid peer-to-peer systems and they usually vary in their level of decentralisation. The hybrid peer-to-peer model requires peers to contain some intelligence, in order to coordinate the activities among the peers.

Typically, hybrid peer-to-peer systems are more scalable (i.e. able to cope with increasing workload gracefully, systematically and essentially transparently) than client and server systems. This is because administrative and coordinative responsibilities are distributed among the peers. However, hybrid peer-to-peer systems can suffer from poor quality of service, particularly in the form of frequent disruption of data availability. This is partly due to the volatile membership of hybrid peer-to-peer networks, in which peers can join and disconnect from the system as often as they wish. Furthermore, the decentralised nature of the hybrid peer-to-peer system gives rise to situations in which data can be served exclusively by peers that own or have obtained the data on an exclusive basis.

These problems are exacerbated in non-public systems, where data is only designated for a small set of users because the potential "servers" of any data are few in number. Furthermore, because peers play a more or less equal role in hybrid peer-to-peer systems, security policy and access rights are difficult to enforce.

A common approach to improve the quality of service in peer-to-peer systems is to make use of redundancy, by caching multiple copies of the same data on multiple peers. This approach has its limitations because reliable resources in hybrid peer-to-peer systems are scarce. This approach also increases the storage requirements of the system, and thus reduces system scalability. Furthermore, this approach poses potential security problems, because some peers may be malicious.

To overcome security problems, some hybrid peer-to-peer systems segment the data physically. Such systems cache only a portion of a given file in any given peer, and distribute the data portions making up the file across a number of peers. A particular file portion stored in any one of the aforementioned peers is typically meaningless on its own, and must be recombined with the other file portions which must be retrieved from the respective peers in which the portions have been stored. This approach increases the latency of such systems due to the substantial increase in complexity of data query and extraction processes.

Alternatively, the entire file can be cached only on designated peers, i.e. peers that have permission to access the data in the file. This reduces the security threat slightly, at the cost of a substantial reduction in quality of service. Furthermore, since the entire data file is repeatedly cached on each of the designated peers, the file is still vulnerable to attacks from non-designated peers. This is because if a non-designated peer compromises the security of a designated peer, the non-designated peer can access the entire data file.

It has also been previously noted that redundancy by itself may not necessarily guarantee a substantial increase in a system's quality of service, due to the volatile nature of the membership, and the decentralised architectural nature of hybrid peer-to-peer systems. A consequence of the volatile membership is that the availability of peers over time is often not uniformly distributed. Further, peers that are in the system may not always be active serving peers.

SUMMARY OF THE INVENTION

It is an object of the present invention to substantially overcome, or at least ameliorate, one or more disadvantages of existing arrangements.

Disclosed are arrangements that seek to address the above problems by partitioning both the network and the data according to a system performance criterion. The partitioned data is cached in corresponding segments of the network according to the system performance criterion and this approach provides degrees of freedom that can be exploited to improve system performance.

According to one aspect of the invention, there is provided a method for caching data in a hybrid peer-to-peer system comprising a plurality of interconnected peer computers, the method comprising the steps of:

(a) establishing a performance criterion;
 (b) arranging the hybrid peer-to-peer system as a plurality of interconnected hierarchical groups of peers by (c) assigning each of the plurality of peers to at least one group as a first function of the performance criterion;
 (d) processing the data into a plurality of hierarchical data partitions;

(e) allocating, as a second function of the performance criterion, each said data partition to at least one of the groups; and (f) caching each said data partition in at least one peer in the corresponding group.

According to another aspect of the invention, there is provided a method by which a sharing peer shares images with a plurality of recipient peers in a hybrid peer-to-peer system, the method comprising the steps of:

(a) caching, by the sharing peer, images for sharing according to the method in claim 1, the images being partitioned at a perceptual level;

(b) notifying the recipient peers that the images are available, the notification providing notification providing information necessary to retrieve the images.

According to another aspect of the invention, there is provided a distributed hybrid peer-to-peer system for distributed data caching, the system comprising a plurality of interconnected peer computers having been arranged by (a) establishing a performance criterion, (b) arranging the hybrid peer-to-peer system as a plurality of interconnected hierarchical groups of peers by (c) assigning each of the plurality of peers to at least one group as a first function of the performance criterion; the system comprising:

(d) means for processing the data into a plurality of hierarchical data partitions;

(e) means for allocating, as a second function of the performance criterion, each said data partition to at least one of the groups; and (f) means for caching each said data partition in at least one peer in the corresponding group.

According to another aspect of the invention, there is provided a computer program, comprising a plurality of program modules, for directing a plurality of processors to execute procedures for caching data in a hybrid peer-to-peer system comprising a plurality of interconnected peer computers, the program comprising:

(a) code for establishing a performance criterion;

(b) code for arranging the hybrid peer-to-peer system as a plurality of interconnected hierarchical groups of peers, said code in (b) comprising code for (c) assigning each of the plurality of peers to at least one group as a first function of the performance criterion;

(d) code for processing the data into a plurality of hierarchical data partitions;

(e) code for allocating, as a second function of the performance criterion, each said data partition to at least one of the groups; and (f) code for caching each said data partition in at least one peer in the corresponding group.

According to another aspect of the invention, there is provided a computer program product including at least one computer readable medium having recorded thereon a computer program module for directing a at least one of plurality of processors to execute procedures for caching data in a hybrid peer-to-peer system comprising a plurality of interconnected peer computers, the program comprising:

(a) code for establishing a performance criterion;

(b) code for arranging the hybrid peer-to-peer system as a plurality of interconnected hierarchical groups of peers, said code in (b) comprising code for (c) assigning each of the plurality of peers to at least one group as a first function of the performance criterion;

(d) code for processing the data into a plurality of hierarchical data partitions;

(e) code for allocating, as a second function of the performance criterion, each said data partition to at least one of the groups; and (f) code for caching each said data partition in at least one peer in the corresponding group.

Other aspects of the invention are also disclosed.

BRIEF DESCRIPTION OF THE DRAWINGS

One or more embodiments of the present invention will now be described with reference to the drawings and appendices, in which:

FIG. 9 shows an image being partitioned into three sub-images for multi-resolution caching;

FIG. 10 shows schematically how an incoming image partition is mapped to a responsible peer;

DETAILED DESCRIPTION INCLUDING BEST MODE

Figure 1:
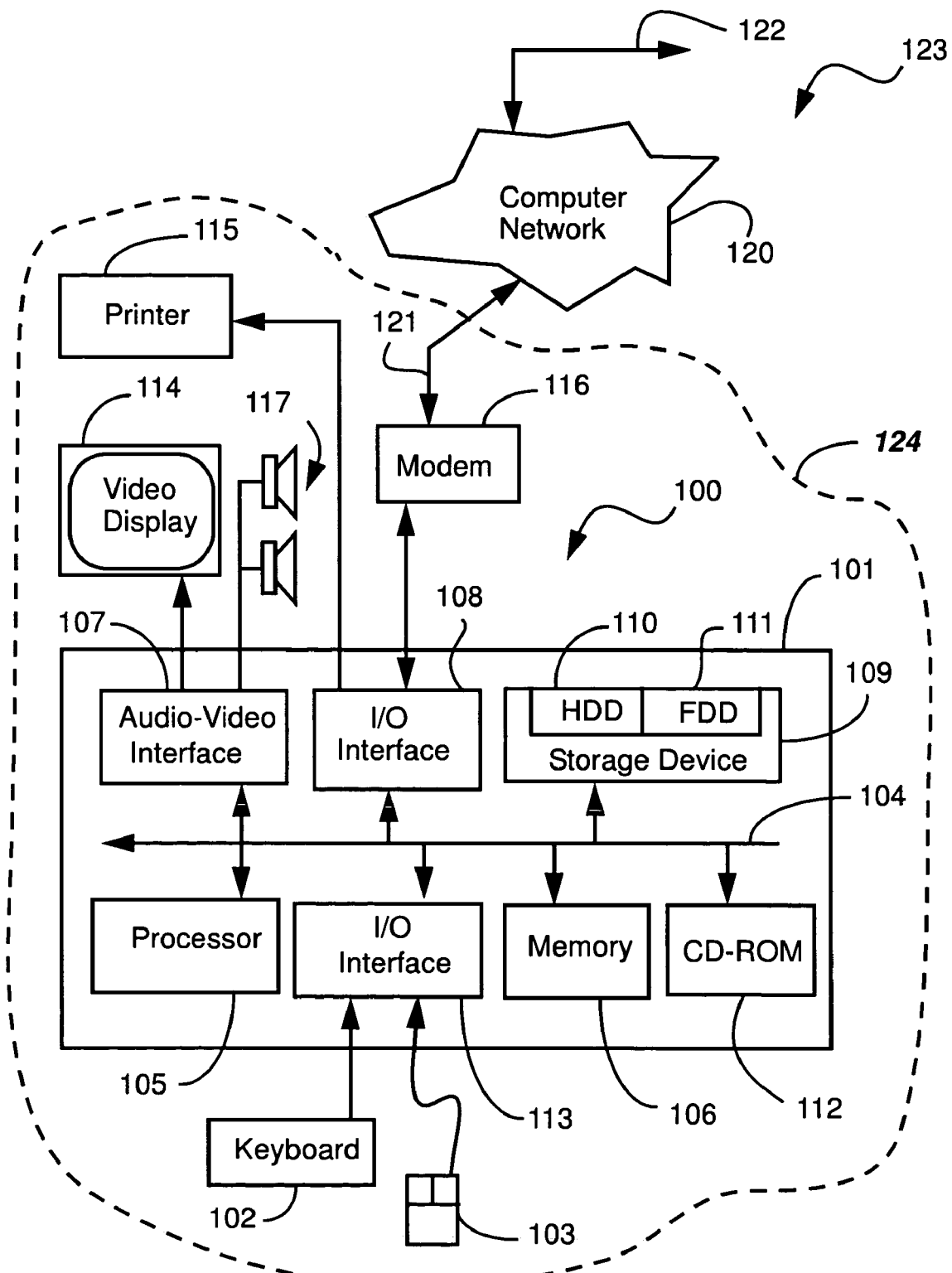
FIG. 1 shows a schematic representation of a fragment of an interconnected hybrid peer-to-peer computer system.

It is to be noted that the discussions contained in the "Background" section and that above relating to prior art arrangements relate to discussions of systems that form public knowledge through their use. Such should not be interpreted as a representation by the present inventor(s) or patent applicant that such documents or devices in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

A number of terms are used throughout the description, and a brief outline of these terms is now presented. A "sharing peer" is a peer machine that is the source of data that is to be shared with other peers in the system. A "responsible peer" is a peer machine which caches at least part of the data that is sourced by the sharing peer. A "recipient peer" is a peer machine which wishes to access data from a responsible peer. A "receiving peer" is a peer in a particular layer that receives an incoming directive to cache or retrieve a data file. Thus, in summary, the sharing peer caches data in a number of responsible peers, and a recipient peer is able to receive data from a responsible peer.

One example of an arrangement for effecting the disclosed distributed data caching technique comprises computer application software, which interacts with and is part of a hybrid peer-to-peer image sharing system. The application software has a user interface to accept commands from the user. The application software also contains logic and protocols to interact with and maintain links to the hybrid peer-to-peer image sharing system. Further, the application software has some means to obtain or create images.

Through interactions with the application user interface, the user, among other functions, is able to select a set of images and share it with a set of users. The shared images are then cached in the system. The set of recipient users are subsequently notified by the system and can obtain the set of images from the system.

FIG. 1 shows a fragment of an interconnected hybrid peer-to-peer arrangement 123 of computer systems. A particular computer system 100 of the interconnected hybrid peer-to-peer arrangement 123, encompassed by a dashed envelope 124, is shown in detail in FIG. 1. Application programs embodying the distributed data caching technique run on each computer system in the hybrid peer-to-peer system 123. A bi-directional arrow 122 depicts connections to other machines in the arrangement 123. It is noted that the "physical" computers participating in the hybrid peer-to-peer arrangement may also be members of other interconnected computer arrangements, provided that the operating system of the computers support multi-tasking.

In FIG. 1, and having regard only to the computer system 100, the processes of FIGS. 3, 11, 13 and 14 may be implemented as software, such as an application program executing within the computer system 100. Corresponding software is installed on all other machines in the hybrid peer-to-peer arrangement 123. Although the following description is directed to the particular computer system 100, it is apparent that the same description applies to other members in the arrangement 123.

Returning to FIG. 1, the steps of method of distributed data caching are effected by instructions in the software that are carried out by the computer system 100 operating in conjunction with other computer systems in the arrangement 123. The instructions may be formed as one or more code modules, each for performing one or more particular tasks. The software may also be divided into two separate parts, in which a first part performs the distributed data caching methods, and a second part manages a user interface between the first part and the user.

The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer systems in the peer-to-peer arrangement 123 preferably effects an advantageous apparatus for distributed data caching.

The computer system 100 is formed by a computer module 101, input devices such as a keyboard 102 and mouse 103, output devices including a printer 115, a display device 114 and loudspeakers 117. A Modulator-Demodulator (Modem) transceiver device 116 is used by the computer module 101 for communicating to and from a communications network 120, for example connectable via a telephone line 121 or other functional medium. The modem 116, which can be used to obtain access to other computer systems in the hybrid peer-to-peer arrangement 123 over the Internet, and other network systems, such as a Local Area Network (LAN) or a Wide Area Network (WAN), may be incorporated into the computer module 101 in some implementations.

The computer module 101 typically includes at least one processor unit 105, and a memory unit 106, for example formed from semiconductor random access memory (RAM) and read only memory (ROM). The module 101 also includes a number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the modem 116 and printer 115. In some implementations, the modem 116 may be incorporated within the computer module 101, for example within the interface 108. A storage device 109 is provided and typically includes a hard disk drive 110 and a floppy disk drive 111. A magnetic tape drive (not illustrated) may also be used.

A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the described arrangements can be practised include IBM-PC's and compatibles, Sun Sparcstations or alike computer systems evolved therefrom.

Typically, the application program is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media.

The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infra-red transmission channels as well as a network connection to another computer or networked device, and the Internet or Intranets including e-mail transmissions and information recorded on Websites and the like.

In order to establish the necessary network architecture for distributed data caching (see FIG. 16 for more detail), it is first necessary to establish at least one performance criterion for the hybrid peer-to-peer system (also referred to as the "target" system). For the described example, the selected performance criterion is "maximum data availability". Data availability is functionally dependent upon numerous factors, and for the present example, two factors are selected namely "allocated bandwidth" and "availability". These factors will be discussed in more detail below. Clearly, other performance criteria could be adopted, such as "maximum data survivability", for example.

An example of the disclosed hybrid peer-to-peer technique is described now in the form of an image sharing system. Peers in this hybrid peer-to-peer image sharing system are categorised, as a function of allocated bandwidth and availability, which as noted above reflect the overall system performance criterion of maximum data availability. One of the purposes of categorising the peers is to gain a broad appreciation of the resources available in the system that relate to the overall system performance criterion in order to better utilise these resources.

The "allocated bandwidth" of a peer is not the bandwidth of the peer's physical connection to the network (see for example 120 in FIG. 1) but the bandwidth that the user had allocated for the peer, i.e. the bandwidth accessible by the peer. The peer's physical connection to the network establishes the rate at which the peer is capable of communicating data with the network. However, the user may not wish to allocate the entire physical bandwidth to the peer-to-peer arrangement because, for example, the user may wish to "surf the web" concurrently, or may wish to participate in another peer-to-peer network. Therefore the user may specify, for example, that the peer-to-peer arrangement consume up to 30% of the physical bandwidth at any time. In mathematical terms, the allocated bandwidth is less than or equal to the physical bandwidth. The "availability" of a peer is a measure of how likely the peer is to be available, from the perspective of another peer in the hybrid peer-to-peer network, at any time. Storage capacity, sub-net address, "reputation" (i.e. a measure of the trustworthiness and integrity) and geographic location may also be factors establishing availability, depending on the desired behaviour (ie the performance criterion) of the target system.

Figure 2:
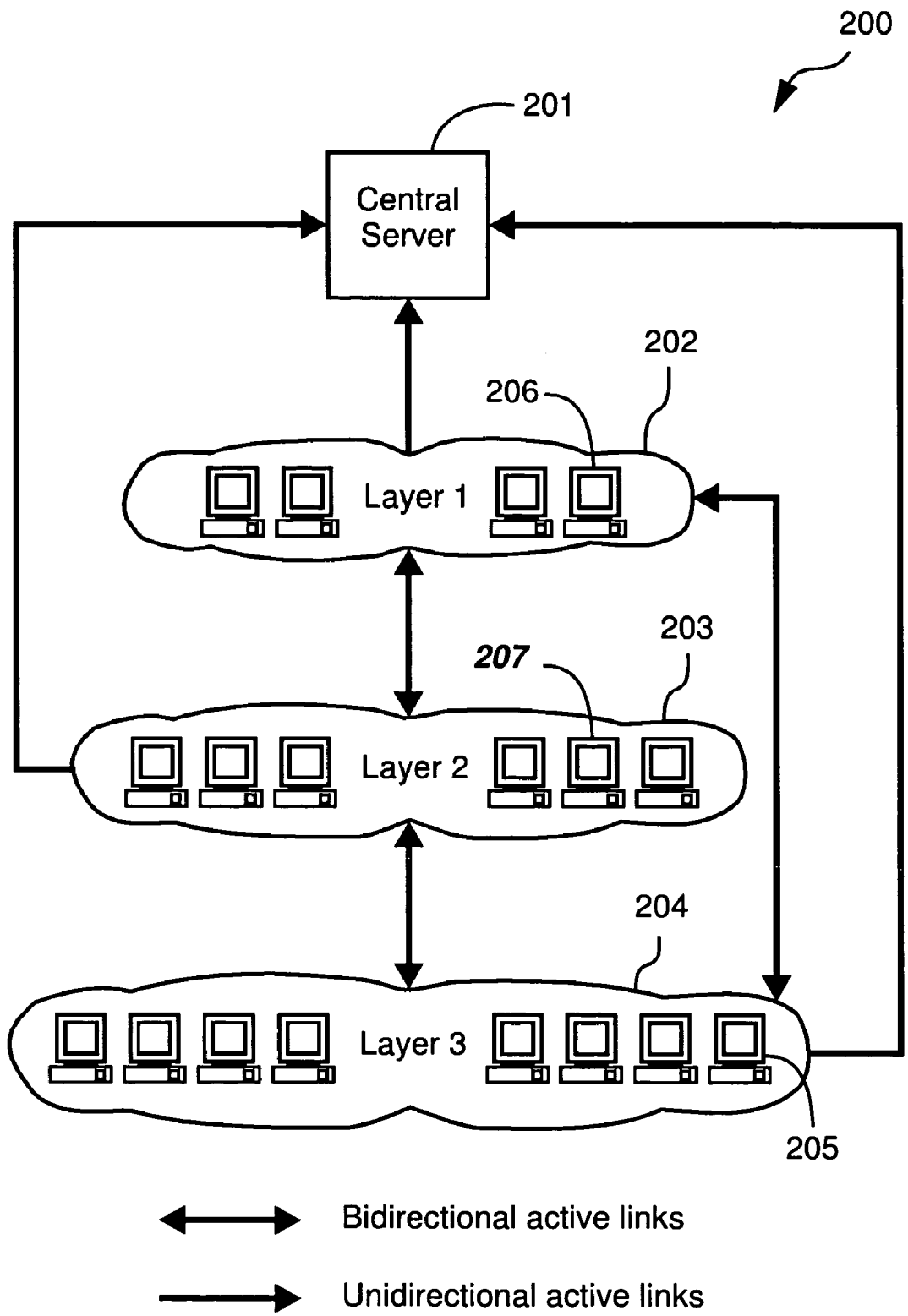
FIG. 2 shows a system representation of a hybrid peer-to-peer photo sharing system example.

FIG. 2 shows the structure 200 of the exemplary hybrid peer-to-peer photo sharing system. The system 200 consists of at least one central server 201 and three independent layers 202-204 of peers. Each peer, such as 205, is running the computer application software for the distributed data caching technique. The central server 201 sits at the top of the hierarchy, has a well-known address and is contactable by any peer at any time. In other words, each peer such as 205 has an "active link" (as described below) to the central server 201. The role of the central server 201 is to authenticate users, and to serve as a first point of contact for (new) peers to join the system 200. The server 201 also assigns each peer, such as 205, to the most suitable layer (of 202-204) and maintains the structure of the system 200. The process of assigning each peer to its suitable layer is described below with respect to FIG. 3.

There are active links linking peers, such as 205, in each layer (202-204) to peers in other layers. These active links are application level links. An active link consists of relevant network parameters such as IP address and port number that enable direct communication between the actively linked peers. A peer is said to have an active link with another peer if it can send message/data to the other peer directly through the underlying communication network.

Figure 3:
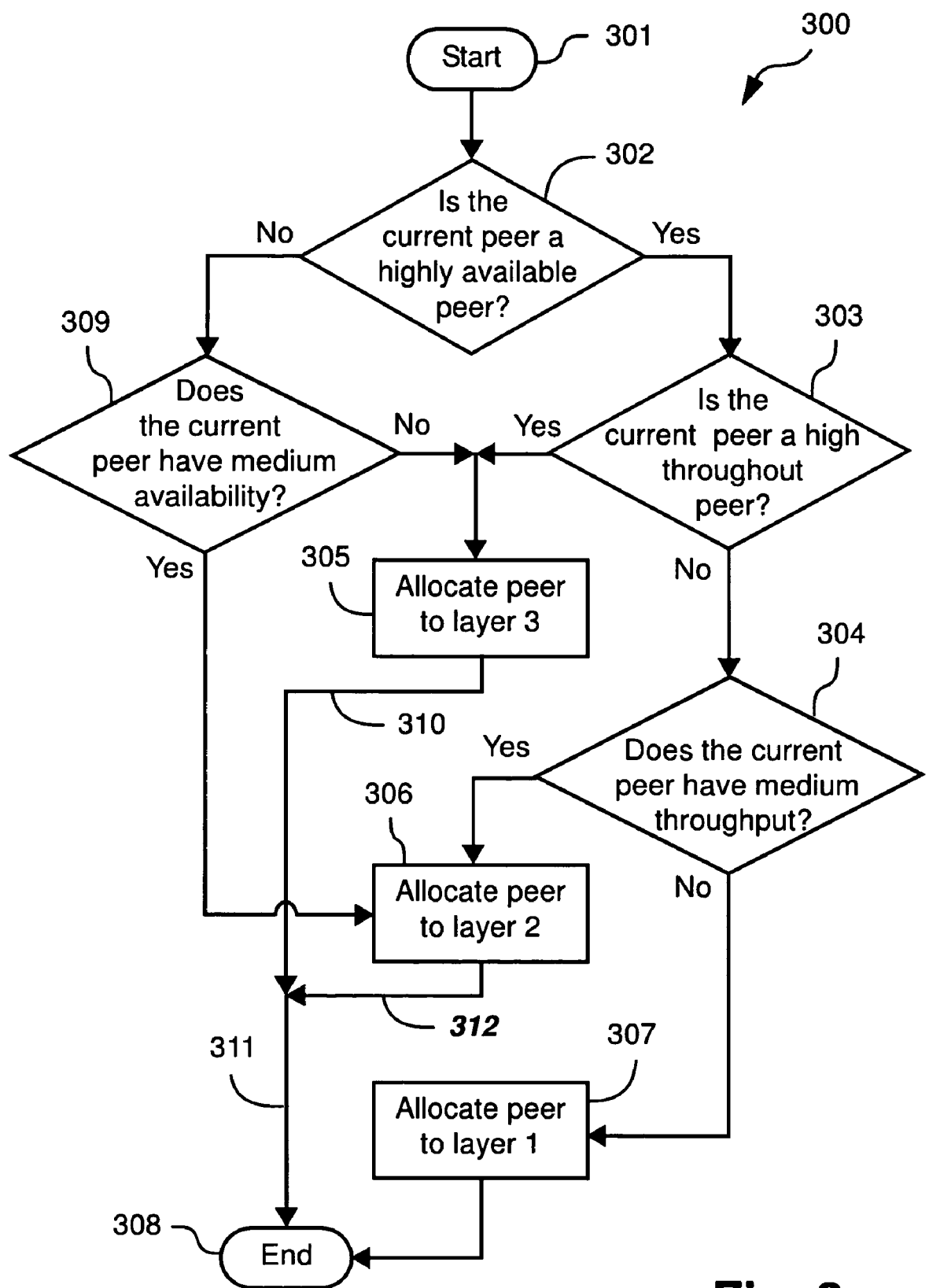
FIG. 3 shows a layer assignment process for a peer joining the hybrid peer-to-peer system of FIG. 2.

FIG. 3 shows the process by which a peer joins the system 200, commencing with the peer contacting the central server 201. A peer can join the system 201 when a "user" of the peer machine activates the necessary commands. Typically, the user will previously have registered with the central server 201. Once the identity of the user is verified by the server 201, the peer is assigned to suitable layer (202-204) based on the availability and allocated bandwidth of the peer.

The availability and allocated bandwidth of a peer can be calculated by the peer itself, or by the central server 201. One way of obtaining the availability of a peer is to calculate the proportion of time the peer is connected to the system from historical time stamps. For instance, a peer can record time stamps when coming online and going offline, and calculate its own availability by using these recorded time stamps. The allocated bandwidth is defined by the user.

FIG. 3 is a flow chart showing the steps of the layer assignment process. The process begins at a step 301, after which a test step 302 determines if the current peer that is being considered (i.e. peer that wishes to join the system) is a peer with high availability. A peer is considered as a peer with high availability if, for instance, its availability is within the top twenty percent compared to the rest of the peers in the target system. In one arrangement, the availability information for the peers is stored by the central server 201 as part of the central server's maintenance role. If the result of the step 302 is true, the process 300 proceeds according to a "YES" arrow to a step 303 to determine if the peer has high throughput. If the result of the step 302 is false, the process 300 proceeds according to a "NO" arrow to a step 309. The step 309 determines if the peer has medium availability, and if so, the process is directed by a "YES" arrow to a step 306 which assigns the peer to Layer 2. A peer is considered a peer with medium availability if, for instance, its availability is within the top forty five percent compared to the rest of the peers and it is not a peer with high availability. Otherwise, the process is directed by the "NO" arrow to step 305 which assigns the peer to Layer 3.

A peer's throughput is defined as:

$$(1-\text{Availability}) * \text{Allocated Bandwidth}$$

where Availability and Allocated Bandwidth are both scaled to a value between zero and one prior to calculating the throughput.

A peer is considered a peer with high throughput if for instance its throughput is within the top twenty percent compared to the throughput of the rest of the high availability peers. The peer is assigned to Layer 3 by the step 305 if it is a peer with high throughput as determined by the step 303. Otherwise the peer is subjected to the further test step 304 to determine if it is a medium throughput peer. A peer is a medium throughput peer if for example its throughput is within the top fifty percent compared to the throughput of the rest of the high availability peers and it is not a high throughput peer. If the test result according to the step 304 is true, the process 300 proceeds according to a "YES" arrow to the step 306 that assigns the peer to Layer 2, after which the process 300 is directed to a stop step 308. Otherwise if the step 304 has a false output, the process 300 proceeds according to a "NO" arrow to a step 307 that assigns the peer to Layer 1 in a step 307. The process completes at the step 308 when the peer is assigned to its suitable layer.

The central server 201 typically knows layer assignments for some or all peers. Each peer knows its own layer assignment. The central server 201 assigns a Peer Unique Identifier (PUID) to each peer when that peer is assigned to a layer in one of the steps 305-307. A PUID is unique within a layer, but peers in different layers may share the same PUID. The central server 201 reserves a set of Peer Unique Identifiers (PUIDs) in Layer 2 and Layer 3 that have more or less equal logical distance between one another. These peer unique identifiers are exclusively assigned to the highly available peers that are scattered in Layer 2 and Layer 3 according to the "YES" arrow emanating from the step 302. This is described in more detail in regard to FIG. 5. For peers which are not highly available, ie according to the "NO" arrow emanating from the step 302, the central server allocates PUIDs on a random basis.

The central server 201 monitors the overall system to determine if there is significant addition of new peers to the system and/or significant emigration of peers from the system. According to the magnitude of the changes to the system, the central server may re-balance distribution of peers in the various layers by re-assigning PUIDs, for either or both the highly-available peers, and the peers which are not highly available.

Figure 4:
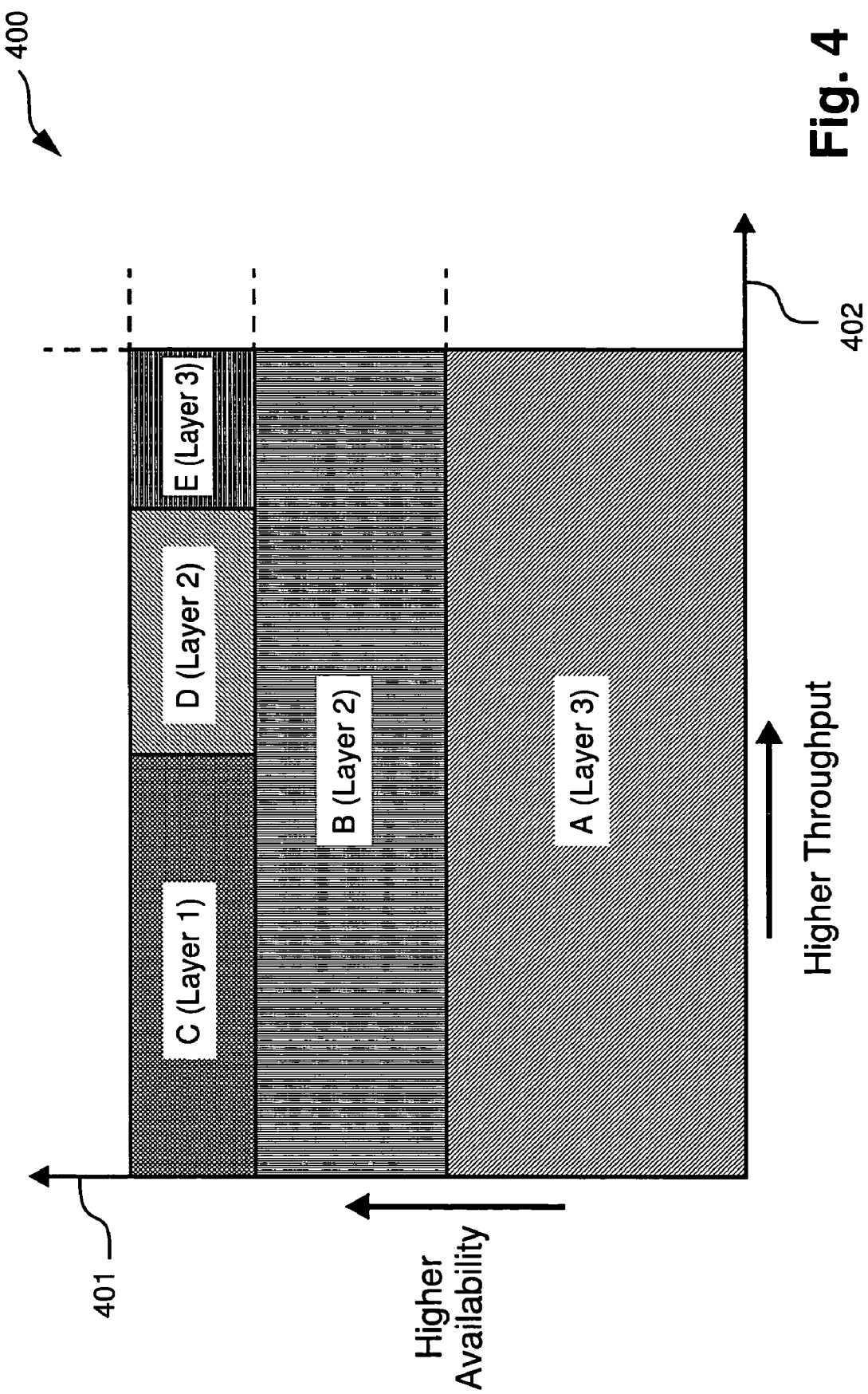
FIG. 4 depicts results of a layer assignment process according to FIG. 3.

FIG. 4 depicts the results of the layer assignment process of FIG. 3, in graph form 400. The graph consists of two independent axes 402 depicting the direction of higher throughput, and 401 depicting the direction of higher availability. The peers are first considered, in the process of FIG. 3, in regard to their availability, which correspond to the vertical axis 401 of the graph. A peer is assigned to region A (corresponding to Layer 3 ie 204 in FIG. 2) if it is not a peer with medium or high availability. It is assigned to region B (corresponding to Layer 2 ie 203 in FIG. 2) if it is a peer with medium availability. Each of the high availability peers is subjected to further test (step 303 and 304 in FIG. 3) based on their throughput. The peer is assigned to region E (corresponding to Layer 3 ie 204 in FIG. 2) if it is a peer with high throughput and region D (corresponding to Layer 2 ie 203 in FIG. 2) if it is a peer with medium throughput. Otherwise it is assigned to region C (corresponding to Layer 1 ie 202 in FIG. 2).

In FIG. 2, as a result of the layer assignment process, Layer 1 (ie 202) consists of peers that have the highest relative availability. Layer 2 (ie 203) consists of peers that have the second highest relative availability while Layer 3 (ie 204) consists of peers that have the lowest relative availability. Additionally, some peers with the highest relative availability are scattered in Layer 2 and Layer 3 (ie 203 and 204 respectively). The highly available peers that are scattered in Layer 3 (ie 204) tend to have the highest relative allocated bandwidth with the smallest relative availability. Those in Layer 2 (ie 203) tend to have the second highest relative allocated bandwidth with larger relative availability. The remaining ones in Layer 1 (ie 202) tend to have the smallest relative allocated bandwidth with the largest relative availability.

The central server 201, with the assistance of some of the peers, constantly monitors and dynamically manages the structure of the system 200 as membership of the system changes. In addition to the case in which new peers join the system, member peers may be moved to other layers as the member peer characteristics change. Peers are also replaced or their role may need to be assumed by other peers as they disconnect from the system. However, to ensure the stability of the system 200, the central server 201 allows a deviation margin of ten percent in any given performance characteristic and only acts after the deviation margin has been exceeded for a certain amount of time.

Thus, for instance, if a user decides to triple the allocated bandwidth for their peer machine thereby changing the peer's throughput by more than 10%, the peer will inform the central server 201 of this change. The central server 201, using the previously described process in FIG. 3, will reassign the peer to a suitable layer.

Turning to the issue of how peers are distributed throughout the various layers, in one arrangement, the central server 201 reserves a set of Peer Unique Identifiers (PUIDs) in Layer 2 and Layer 3 that have more or less equal logical distance between one another. These peer unique identifiers are exclusively assigned to the highly available peers that are scattered in Layer 2 and Layer 3. The "more or less equal logical distance" between the peer unique identifiers prevents clustering of these peers within the layers. The unique identifiers of the remaining peers are randomly assigned by the central server 201 to ensure diversity of peers that have adjacent unique identifiers.

In an alternate PUID arrangement, metrics such as packet latency and hop count can be used to allocate PUIDs. Thus, for example, if it was desirable that peers that are potentially physically closer to the central server 201 be allocated with peer unique identifiers that are smaller, then a hop count test can be carried out prior to assigning peer unique identifiers to the peers to determine physical proximity of peers to the central server 201.

Figure 5:
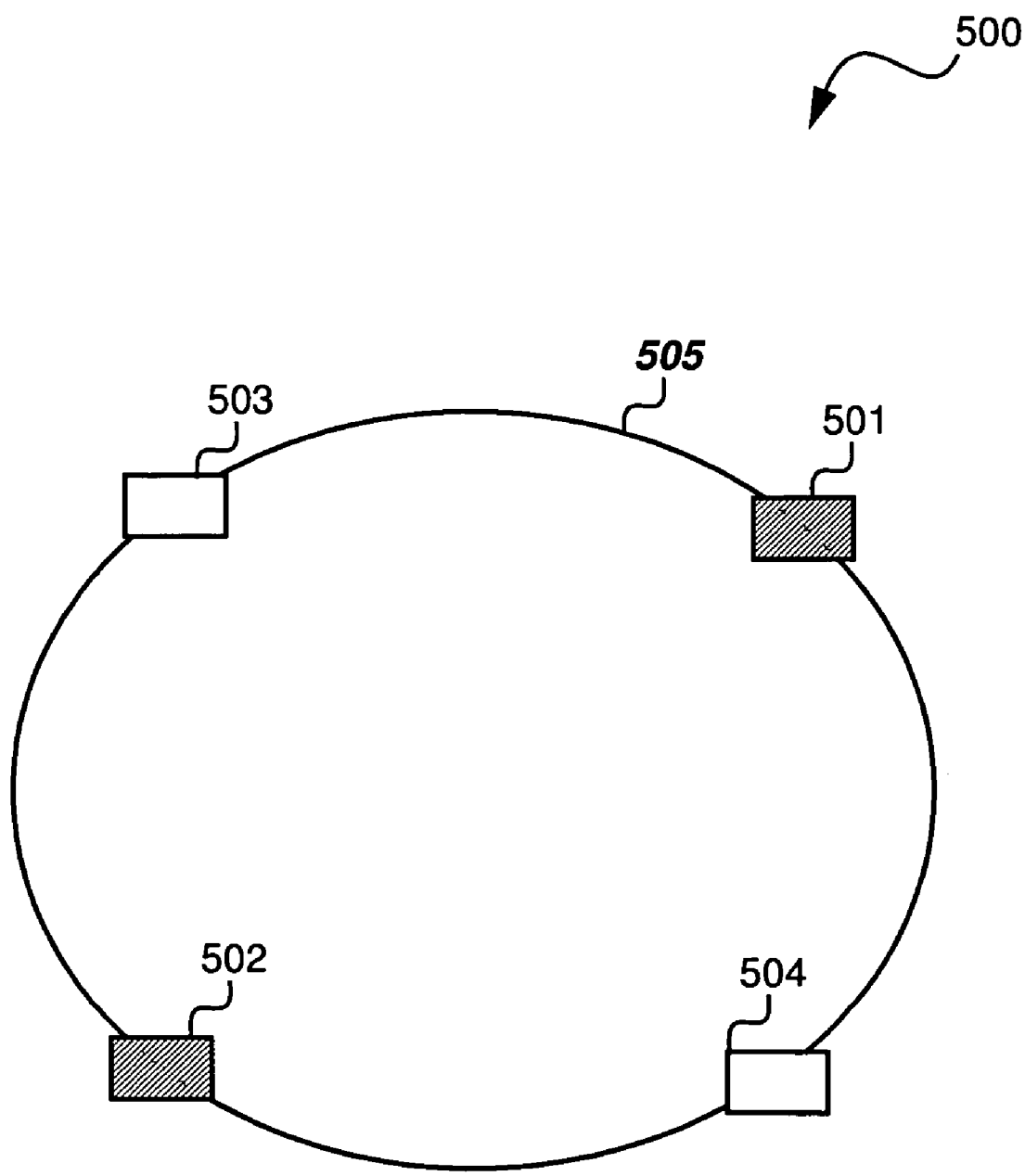
FIG. 5 is a logical representation of a layer showing allocated peer identification parameters.

FIG. 5 shows an example of a logical view of a layer, depicted by an ellipse 505. The ellipse 505 represents an ordered peer unique identifier space for a simple example in which, for the sake of illustration, PUIDs comprise single characters falling between the letter "a" and the letter "z" (in a practical arrangement, the PUIDs typically consist of 128-bit binary values). Two highly available peers 501 and 502, characterised by cross hatched patterns, are assigned respective identifiers "a" and "n" by the central server 201. The arrangement of the layer 505 ensures that the PUIDs for the peers 501 and 502 are logically spaced so that they are located at "opposite" sides of the ellipse 505. Two other peers 503 and 504 depict peers that were successively assigned by the process of FIG. 3 to the layer in question. These peers 503 and 504 are also located at "opposite" sides of the ellipse 505 from each other, thereby illustrating that the peer identifiers allocated to them, ie "g" and "t" respectively, were allocated on a random basis by the central server 201.

According to one arrangement, the logical distance between two peers is determined by numerically comparing their peer unique identifiers. Operators such as, but not limited to, XOR and subtraction can be used to compare the unique identifiers. For instance, if the subtraction operator was used, the distance between peer A and peer B can be defined as $|PUID_A - PUID_B|$.

Within a layer, such as that depicted in FIG. 5, each peer maintains active links to two of its closest neighbours (one in the clockwise direction and one in the anti-clockwise direction around the logical ring 505), active links to two neighbours that are at least 10 units distance away along the ring 505 (one per direction) and active links to at least one peer in each of the remaining two layers. Additionally, a peer may learn (ie establish) new active links over time. These (new) active links are not learned proactively but incidentally from the messages that the peer receives. For instance, a peer may receive messages from other peers and some of these peers may be new to the receiving peer. The receiving peer then "learns" the existence of these new peers by caching relevant network parameters to form active links to these new peers. Furthermore, there may be additional active links between the peers used by an error recovery algorithm if this is installed and running on the peer in question.

Figure 6:
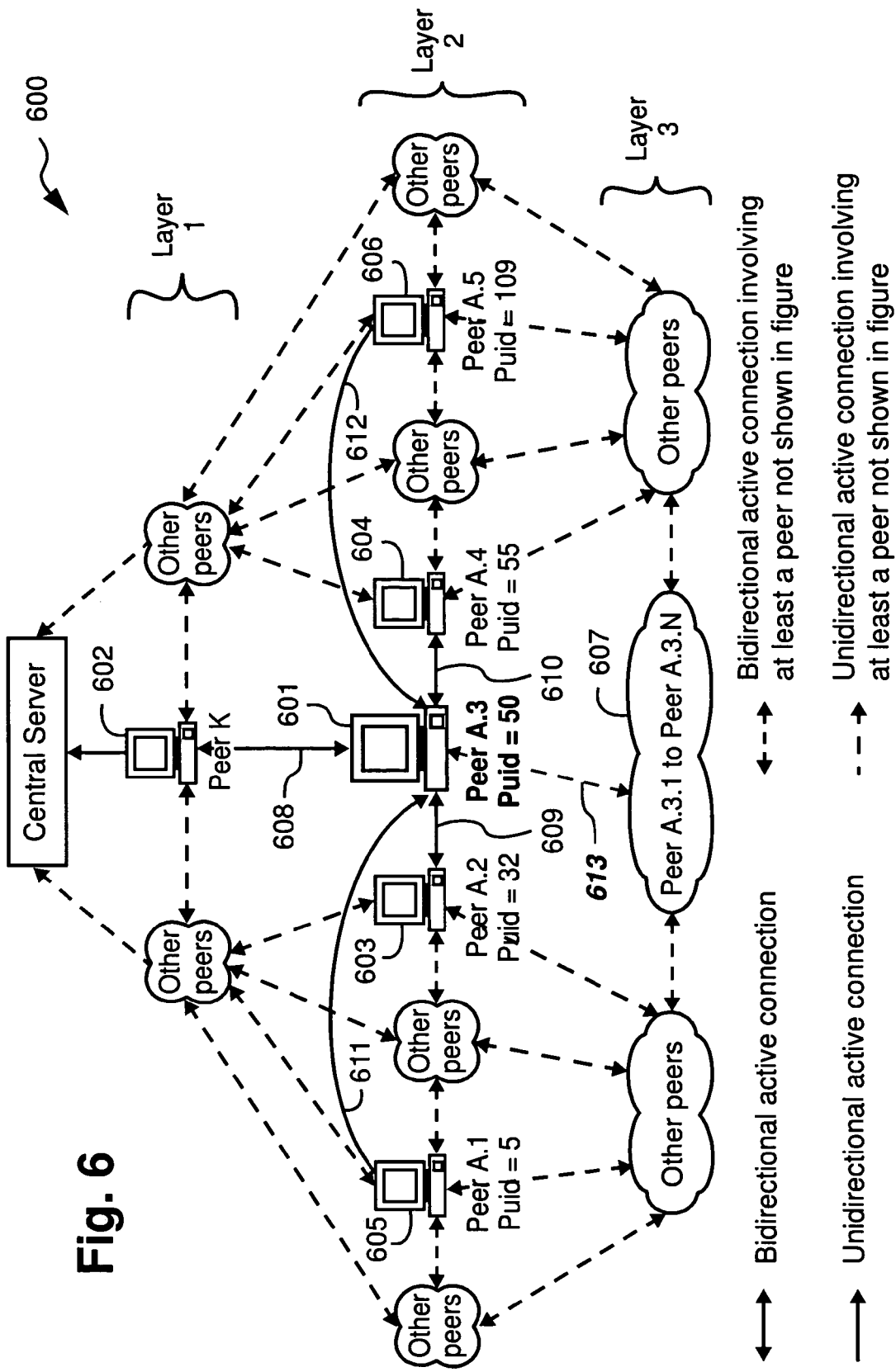
FIG. 6 depicts various link types in the system of FIG. 2.

FIG. 6 shows an arrangement 600 in which various ones of the link types described are depicted. Thus, for instance, Peer A.3 (ie 601) has respective links 608, 609, 610, 611 and 612 to corresponding ones of Peer K (ie 602), Peer A.2 (ie 603), Peer A.4 (ie 604), Peer A.1 (ie 605) and Peer A.5 (ie 606). Peer A.3 (ie 601) also has links 613 to the set of peers ranging from Peer A.3.1 to Peer A.3.N(ie 607).

The disclosed distributed data caching technique is able to support a variety of peers with different software and hardware capabilities by instituting only minor modifications. Thus, for example, in order to accommodate certain types of peers, "Data Distillation Algorithms", and additional logic and protocols may be needed in some of the peers.

Data Distillation Algorithms transform or filter data into a form suitable for delivery and presentation to a particular target device. For example, images are decimated for presentation to mobile phones in order to consume less bandwidth and so that the images fit into the small displays that are typical in mobile phones.

Figure 7:
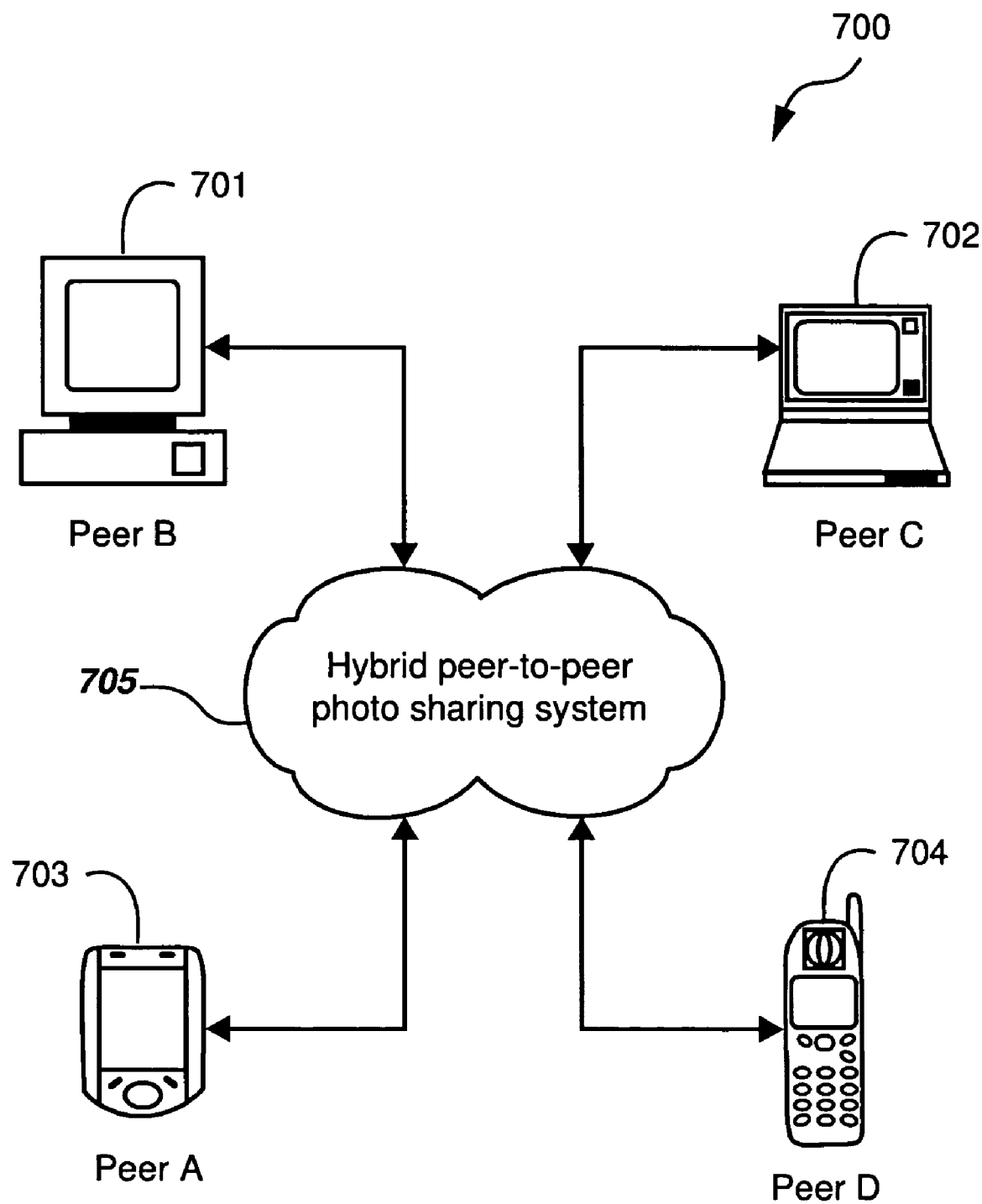
FIG. 7 shows possible peers that can be incorporated into the system of FIG. 2.

FIG. 7 shows one arrangement 700 depicting some of the possible peers that can be incorporated into a hybrid peer-to-peer system supporting the distributed data caching technique. Peer B (ie 701) is a desktop computer, Peer C (ie 702) is a notebook/laptop computer, Peer D (ie 704) is a mobile phone and Peer A (ie 703) is a PDA (Personal digital assistant) device. All the aforementioned peers 701-704 are interconnected to a hybrid peer-to-peer photo-sharing system 705.

As soon as a peer is assigned to its suitable layer according to the process of FIG. 3, for example, and connected to the system 200, it is able to share images with other peers and access any image that was shared with it. When the peer shares images however, it needs to cache the images in the system 200.

Figure 8:
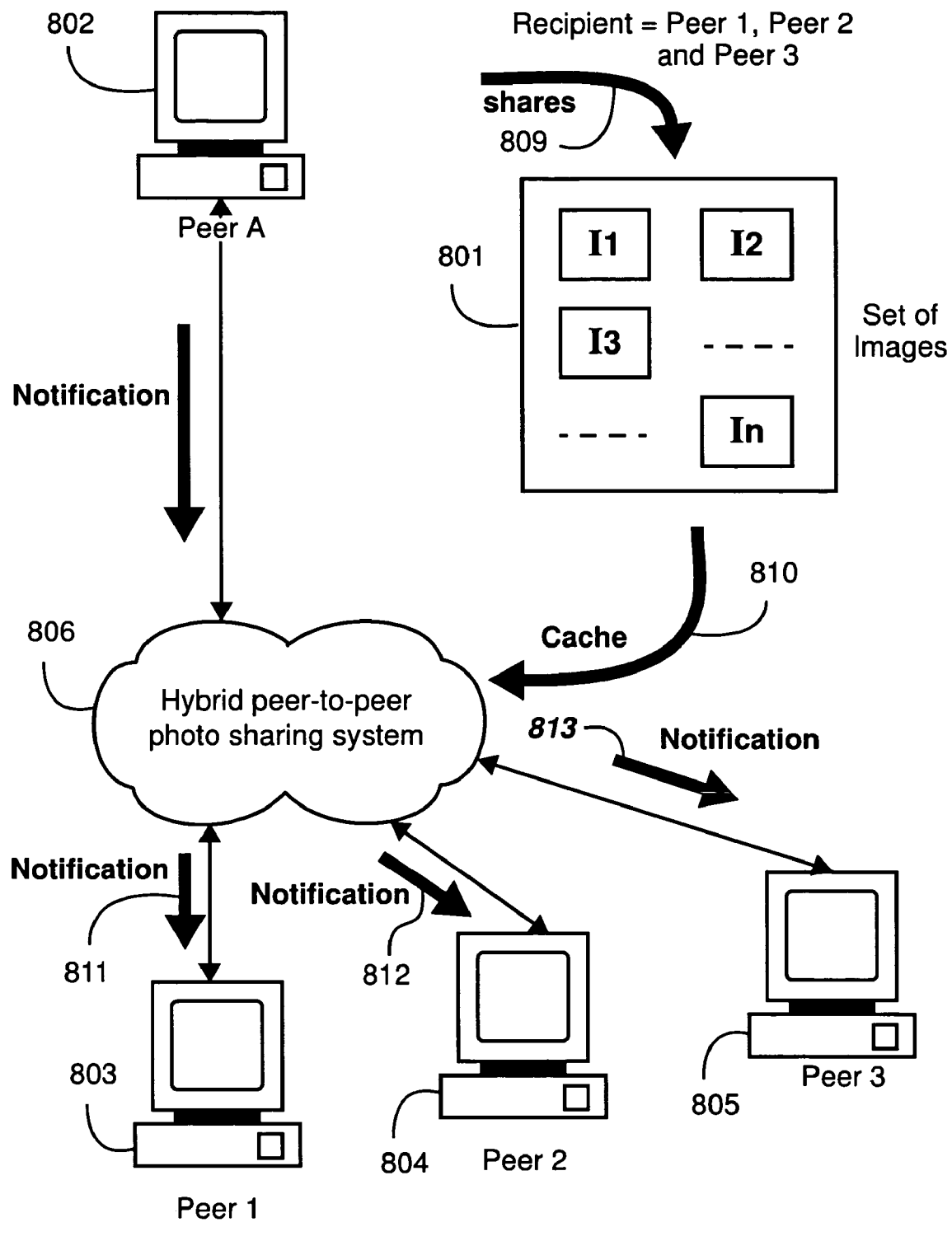
FIG. 8 shows a set of images being shared by sharing peer with recipient peers.

FIG. 8 shows a set of images 801 being shared by sharing peer A (ie 802) with recipient Peer 1, Peer 2 and Peer 3 (ie 803-805 respectively). The images 801 are selected for sharing by means of the user interacting, as depicted by an arrow 809, with the application software user interface on Peer A. The shared images are then cached, as depicted by an arrow 810, in responsible peers in the system 806. It is noted that part of the information to be shared may be cached in the intended recipient peers 803-805. However, there is not necessarily a correspondence between responsible peers upon which information is cached, and recipient machines with which data is shared. Notifications, that may take the form of short messages, for example, are then sent to the recipients as depicted by arrows 811-813. These notifications may be temporarily stored in the system 806 or elsewhere if any of the destination recipient peers 803-805 is not currently connected to the system 806. Other notification methods may also be used. These notification methods may be performed within, or external to the system 806. External methods include email, Short Message Service (SMS) or instant messaging.

Prior to caching the images 801 so that they can be shared with other peers, the images 801 are partitioned by the sharing peer. After partitioning, each image partition is cached in the appropriate responsible peers in a specific layer of the system 200, after considering the objective (ie the performance criterion and/or the associated functionally related factors) of the target system.

In the present image-sharing example, the images are partitioned at the perceptual level rather than the physical level. In other words, the partitioning is performed using, for example, a wavelet transform (to obtain perceptual partitioning) rather than by merely physically segmenting the bit-map of the image into different physical tiles. The goal in the present image-sharing example is to produce different representations of an image with different physical (byte) sizes, by manipulating the perceptual details while preserving the semantic information. Other partitioning approaches using colour and/or quality reduction can also be used.

The partitioning technique can be applied to a wide spectrum of data. The partitioning technique and perceptual criteria to be used are chosen based on the desired behaviour (ie the performance criterion) of the target system, and the nature and type of the data. For instance, criteria such as frequency range, bit rate, etc. can be used on audio/sound data. In relation to video data, clip-based partitioning based on time sequence and/or clip content, for example, can be used.

Depending on the partitioning technique and the desired behaviour of the target system, the semantic information may not be preserved across every version of the data. In such cases, the versions of the data in which semantic information is not preserved may contain only additional perceptual details, to thereby minimise their physical (byte) size. Accordingly, they may be used together with other versions of the data to produce a version that has more perceptual details.

In one preferred arrangement, each of the images 801 is partitioned into three representations of the original image on a resolution basis. This produces a low-resolution version, medium-resolution version and high-resolution version of the image. Each version can be decoded on its own right, i.e. the semantic information is preserved across all versions. If the original image is not encoded in the preferred encoding technique, the image can be transcoded into the preferred encoding technique during the partitioning process. The preferred encoding technique is any suitable image compression encoding technique such as JPEG. The image may also be resized prior to being transcoded.

FIG. 9 shows an image 901 being partitioned into three sub-images 902-904 having different respective resolutions. $I_{11}$ (ie 902) is the low-resolution version, $I_{12}$ (ie 903) is the medium-resolution version and $I_{13}$ (ie 904) is the high-resolution version.

The performance criterion for this example of the distributed caching technique is to achieve maximum data availability, thereby achieving improved quality of service. Therefore, it is important that users are able to obtain the low-resolution version (ie 902) of any image (eg 901) under virtually all circumstances. The low-resolution version of an image, even though it contains less perceptual detail, can convey useful and meaningful information about the original image to the user. Additionally, the physical (byte) size of the low-resolution image is relatively small compared to that of the original image.

Accordingly, in the image-sharing example, the low-resolution version of every image is cached in peers (eg 206) in Layer 1 (ie 202 in FIG. 2) as these peers are the most reliable in the system. As it is also desirable that users be able to obtain the versions of image partitions with extra perceptual details, the medium-resolution version of every image is cached in peers (eg 207) in Layer 2 (ie 203) while the high-resolution version is cached in peers (eg 205) in Layer 3 (ie 204).

Once the images to be shared are partitioned and each partition assigned to its respective layer, the image partitions are uploaded by the sharing peer to the responsible caching peers in each of the different layers. The timing of the upload process can be varied independently for each peer and/or each image, and/or each partition. Furthermore, a different access policy can be applied independently to each partition of the images. In other words, some partitions may be available to all peers in the system 200, while other partitions may be made available only to selected peers in the system 200. Still further, some of the image partitions, in particular the ones with larger physical (byte) size may be uploaded only on demand. Such large partitions may remain at the sharing peer machine, and only be uploaded to the responsible caching peers as this becomes necessary or desirable.

Within each layer 202-204 of the system 200, images are indexed independently using, for example, a distributed hash table. According to one arrangement, no single peer within each layer has a complete list of where data may be stored in the layer. Instead, each peer maintains only a partial list of where data is stored in the layer. Data is located by "combining" these partial lists. As previously described, peers are logically arranged in each layer in a virtual circular ring as depicted in FIG. 5. Peers have links, as described in relation to FIG. 6, for example, to their next closest (measured using the logical distance mentioned earlier on) neighbours, and to other peers in different regions of the circular ring.

FIG. 10 shows the peer 503, that is a member of the logical ring 505 (see FIG. 5). The peer 503 maintains a hash function 1001, such as MD5 (see RFC1321 from the Internet Engineering Task Force). The peer 503 also has a peer unique identifier (PUID) 1004 as has been assigned to it by the central server according to the process of FIG. 3, and as described in relation to FIG. 5. In addition to the images that the peer 503 owns and/or has obtained (in respect to which the peer is a sharing peer), the peer 503 is responsible for caching image partitions that are mapped to it. In respect to these latter image partitions, the peer is a responsible peer.

In the described arrangement, the peer 503 is a sharing peer in regard to an image (not shown) and the peer 503 randomly assigns the image a unique Image Identifier (otherwise referred to as an IID). The peer 503 partitions the image (not shown) into partitions, including the partition 1002. Image partitions such as 1002 that originate from the aforementioned image are assigned the same IID 1003. The sharing peer 503 maps the image partition 1002 to a responsible peer by applying the hash function 1001 to the IID 1003 of the image partition 1002. This hashing produces, as depicted by a dashed arrow 1007, a PUID 1007 which identifies the responsible peer which is to cache the partition 1002. Each partition of the aforementioned image is mapped using this process.

Other methods of determining the mapping such as applying a hash function to the content of the images and/or the unique identifier of the peers may be used. Any suitable hashing algorithm such as MD5 can be used.

Figure 11:
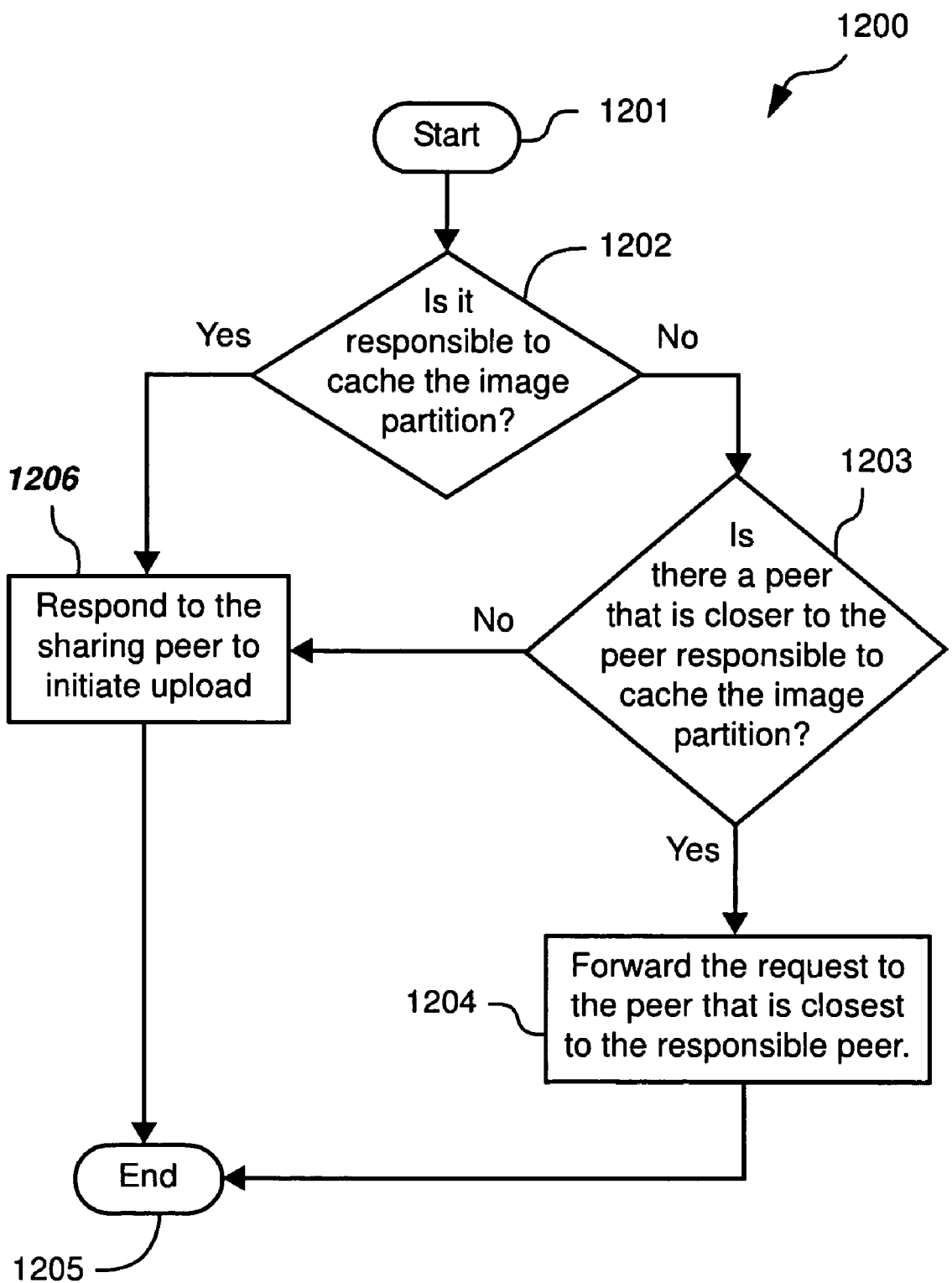
FIG. 11 is a process showing the steps taken by a peer after it receives a message from the sharing peer or from any other peer within its layer.

FIG. 11 is a flow chart for a process 1200 showing the steps taken by a peer, referred to as the receiving peer, after receiving the message from the sharing peer or any other peer within its layer. The process 1200 commences at 1201 after which the receiving peer performs a test in a step 1202 to determine if it (ie the receiving peer) is responsible for caching the image partition. This is the case if the receiving peer has the same PUID as that generated for the incoming image partition as described in relation to FIG. 10. If this is the case, then the receiving peer is a responsible peer for the incoming image partition, and the process 1200 follows a "YES" arrow to a step 1206 in which the receiving peer responds to the sharing peer to initiate upload. The process 1200 then terminates in a step 1205. Otherwise, if the receiving peer determines, in the step 1202, that it is not responsible for caching the image, because the PUID of the receiving peer does not match the PUID generated for the incoming image partition, then the process 1200 follows a "NO" arrow to a step 1203.

In the step 1203 the receiving peer further examines if there is a peer, actively linked to it, that is closer (measured using the logical distance mentioned earlier on) than itself (ie the receiving peer) to the peer responsible to cache the image partition (ie closer to the PUID generated for the incoming image partition). Such a "closer" peer might be the responsible peer itself, which clearly has a logical distance of zero from itself. The "actively linked" peers are determined by looking up the partial list stored at the receiving peer. If there is such a peer, then in a following step 1204 the request is forwarded to the peer that is closer (measured using the logical distance mentioned earlier on) to the responsible peer, after which the process 1200 terminates at the step 1205. Alternatively, if the step 1203 determines that there is no peer that is closer to the responsible peer, then the process 1200 is directed by a "NO" arrow to the step 1206. In the step 1206, the receiving peer responds to the sharing peer to initiate upload as it is closest (measured using the logical distance mentioned earlier on) to the responsible peer, which is not present (i.e. the peer unique identifier is not assigned to any peer) and the process terminates.

Once the image partition is uploaded to the responsible peer, the responsible peer will nominate two of its closest (measured using the logical distance mentioned earlier on and described in relation to FIG. 5) neighbours to also cache the image partition. The responsible peer will send a message to the sharing peer to initiate upload of the image partition to one of the nominated peers while it (ie the responsible peer) uploads the image partition to the other nominated peer. The responsible peer also caches the image partition. The uploading process completes when all partitions of all images are uploaded to their designated peers. Clearly the responsible peer could, in an alternate arrangement, communicate the image partitions to both nominated peers after the responsible peer itself receives the image partition from the sharing peer.

Figure 12:
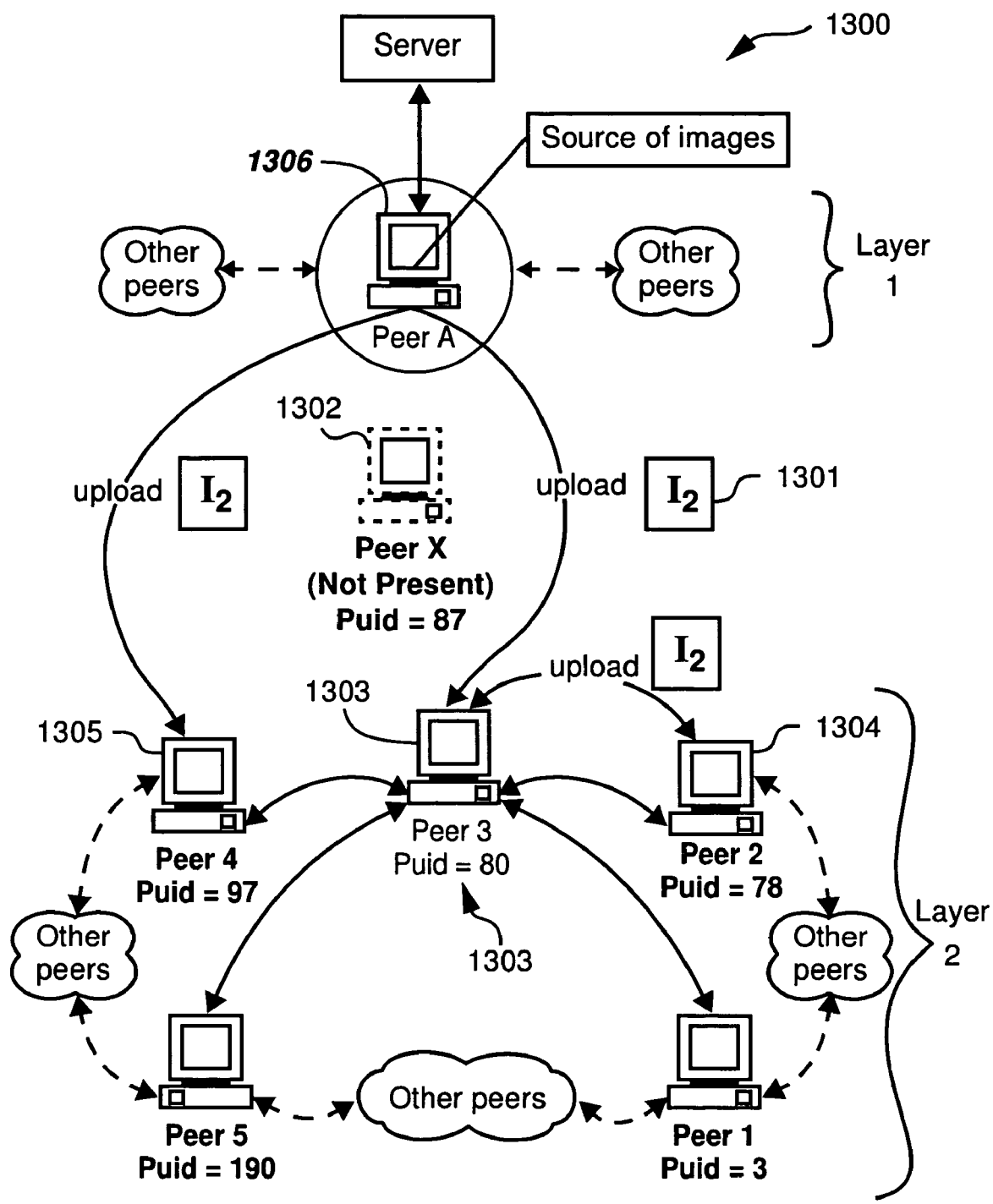
FIG. 12 shows an image partition being uploaded to caching peers.

FIG. 12 depicts an image partition being uploaded to the relevant peers. An image partition $I_2$ (ie 1301) is mapped by the corresponding sharing peer to a target responsible Peer X (1302) having a PUID of 87. Since the target responsible Peer X (ie 1302) is not present, the image partition 1301 is uploaded to a Peer 3 (ie 1303), which has a PUID of 80 because the Peer X (ie 1302) is not present. It is noted that Peer 3 (ie 1303) is the next closest peer (measured using the logical distance mentioned earlier on) to Peer X (ie 1302). Subsequently, a Peer 2 (ie 1304) and a Peer 4 (ie 1305) are nominated by the Peer 3 (ie 1303) to also cache the image partition 1301. A message is then sent to a Peer A (ie 1306) by the Peer 3 (1303) to initiate upload of the image partition $I_2$ (ie 1301) to the Peer 4 (ie 1305) while the image partition $I_2$ (ie 1301) is uploaded to the Peer 2 (ie 1304) by the Peer 3 (ie 1303). The Peer 3 also caches the image partition $I_2$.

The recipient peers are notified on the completion of the above-noted image upload process. At minimum, the notification consists of necessary information to retrieve the images from the system such as the image identifiers. It may also contain additional information such as the description of the images and access rights. The recipients can then obtain the images from the system at times of their convenience. The image retrieving process is quite similar to the image uploading process.

Figure 13:
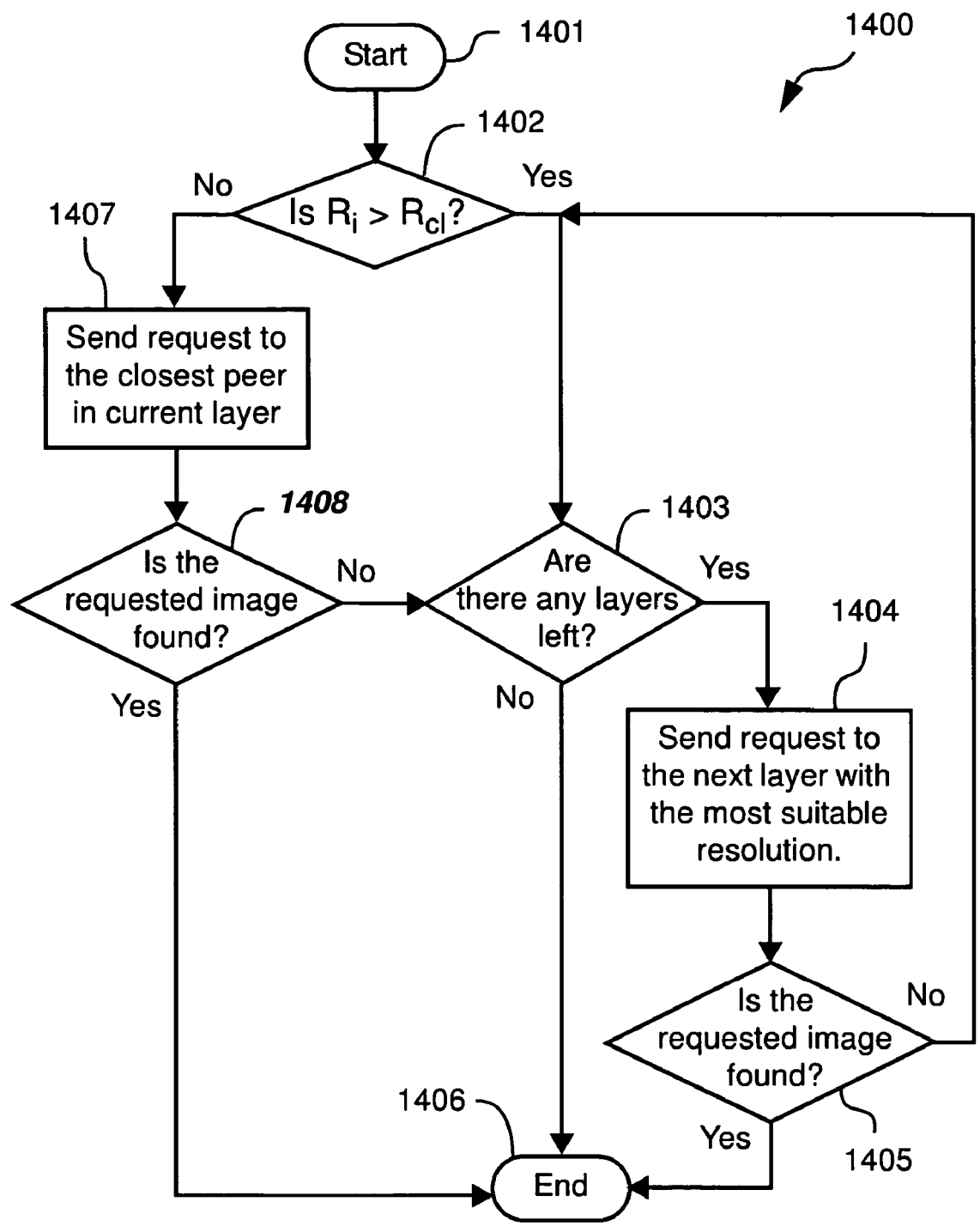
FIG. 13 shows an image retrieval process.

FIG. 13 is a flow chart of a process 1400 showing the steps of the image retrieval process by a recipient peer. The process 1400 commences at 1401, after which the recipient peer determines, in a step 1402, if the resolution of the requested image is larger than the resolution that is assigned to be cached in the current layer in which the recipient peer resides. If the requested resolution is not larger, the process is directed by a "NO" arrow to a step 1407 in which the recipient peer sends the request to an actively linked receiving peer in the current layer that is closest to the responsible peer which is responsible for caching the image. A subsequent testing step 1408 determines if the requested image has been found by the receiving peer. If this is true, then the process 1400 follows a "YES" arrow to a terminating step 1406. Otherwise the process follows a "NO" arrow to a step 1403 and the search is continued in other layers.

Returning to the step 1402, if the requested resolution is larger, the process 1400 follows a "YES" arrow to the step 1403 that conducts a test, by the recipient peer, to determine if there is any other possible layer that may contain the requested image. If the result is true, then the process follows a "YES" arrow to a step 1404 in which the recipient peer sends the request to an actively linked receiving peer in the next layer with the most suitable resolution. In a following testing step 1405, the recipient peer determines if the requested image is to be found in that next layer. If the requested image is found in that next most suitable layer then the process follows a "YES" arrow to the terminating step 1406. Alternatively, the process follows a "NO" arrow to the step 1403 in which the recipient peer sends the request to a receiving peer in another layer and in this way the search is repeated until all the layers have been searched. Returning to the step 1403, if the step 1403 returns a "FALSE" value, then the process 1400 follows a "NO" arrow to the terminating step 1406.

Figure 14:
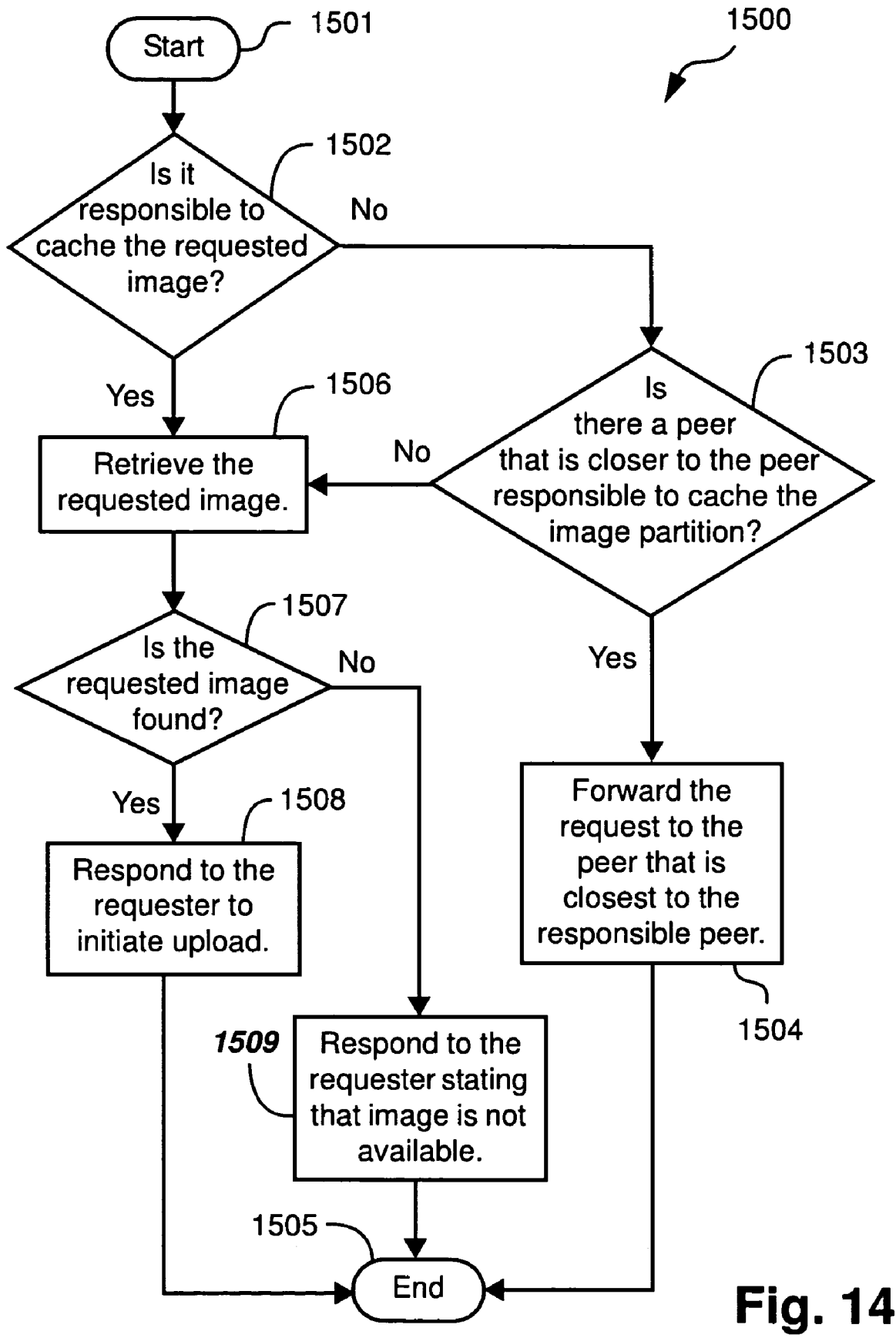
FIG. 14 shows how a receiving peer handles an image retrieval request.

FIG. 14 is a flow chart of a process 1500 showing the steps taken by a receiving peer after receiving the request, passed in step 1404 or 1407 (see FIG. 13), from the recipient peer or any other peer within its layer. The process 1500 commences at 1501, after which upon receiving the request, the (current) receiving peer determines in a step 1502 if it (ie the current receiving peer) is also the responsible peer ie the peer that is responsible for caching the requested image. If so, the process 1500 follows a "YES" arrow to a step 1506 in which the receiving (ie the responsible) peer attempts to retrieve the image. A subsequent testing step 1507 checks if the requested image can be found. If this is the case, the process 1500 follows a "YES" arrow to a step 1508 in which the receiving (ie the responsible) peer responds with the result of the attempt to the recipient peer by advising the requesting peer to initiate an upload of the located image from the responsible peer. If the step 1507 determines that the requested image is not to be found, the process 1500 follows a "NO" arrow to a step 1509 that responds to the requesting peer (ie the recipient peer) that the image is not available. Then the process 1500 terminates at the step 1505.

Returning to the step 1502, if the current receiving peer determines that it is not the responsible peer, the process 1500 follows a "NO" arrow to a step 1503 in which the receiving peer performs a test to determine if there is a peer that is closer to the responsible peer. Such a "closer" peer might be the responsible peer itself. If the result is true the process 1500 follows a "YES" arrow to a step 1504 that forwards the request to the peer (which becomes the current receiving peer) that is closer to the responsible peer. Alternatively, if the step 1503 determines that there is no closer peer, then the process 1500 follows a "NO" arrow to the step 1506 in which the receiving peer attempts to retrieve the requested image, as the responsible peer is not present (i.e. the peer unique identifier is not assigned to any peer).

Figure 15:
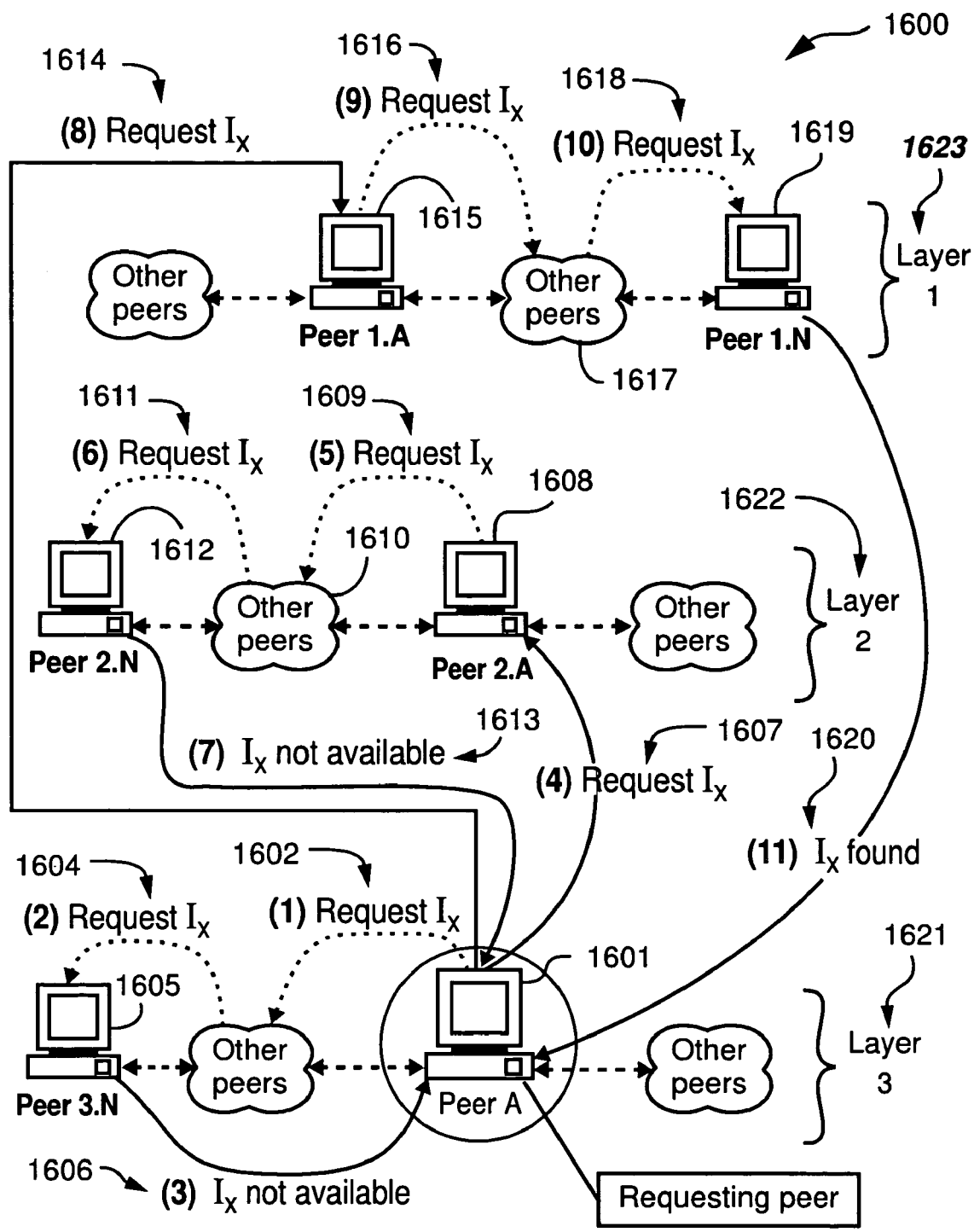
FIG. 15 shows how an image is retrieved across a multi-layer system.

FIG. 15 shows an arrangement 1600 in which an image $I_x$ is retrieved from the system. A recipient Peer A (ie 1601) first attempts to search for $I_x$ in the current layer ie Layer 3 (1621) because the Peer A (ie 1601) is after the high-resolution version of $I_x$. Subsequently, the Peer A (ie 1601) attempts to search for $I_x$ in Layer 2 (ie 1622) because the medium-resolution version of $I_x$ is the next most suitable resolution. As $I_x$ is not found in the Layer 2 (ie 1622), the search is continued in Layer 1 (ie 1623). Finally, a Peer 1.N (ie 1619) that has a cached version of $I_x$ responds to the Peer A (ie 1601) to initiate download of the low-resolution of $I_x$.

Following the aforementioned process in more detail, the recipient Peer A (ie 1601) that is in the Layer 3 (ie 1621) sends a request 1602 for $I_x$ to other (receiving) peers 1603 in the Layer 3 (ie 1621). At some point one of these receiving peers sends a request 1604 to a (then current) receiving Peer 3.N (ie 1605) that sends a message 1606 to the Peer A (ie 1601) indicating that the image $I_x$ is not available on the Level 3 (ie 1621).

The recipient peer A (ie 1601) then sends a request 1607 to a receiving Peer 2.A on the Layer 2 (ie 1622) for the image $I_x$. The receiving peer 1608 sends a request 1609 to other receiving peers 1610 at Layer 2 (ie 1622). At some point one of these peers sends a request 1611 to a receiving Peer 2.N (ie 1612) on Layer 2 (ie 1622) that sends a message 1613 to the recipient Peer A (ie 1601) indicating that the image $I_x$ is not available on the Level 2 (ie 1622).

The recipient peer A (ie 1601) then sends a request 1614 to a receiving Peer 1.A (ie 1615) on the Layer 1 (ie 1623) for the image $I_x$. The receiving peer 1615 sends a request 1616 to other receiving peers 1617 at Layer 1 (ie 1623). At some point one of these receiving peers sends a request 1618 to a receiving Peer 1.N (ie 1619) on Layer 1 (ie 1623) that sends a message 1620 to the recipient Peer A (ie 1601) indicating that the image $I_x$ has been found on the Level 1 (ie 1623) and tells the Peer A (ie 1601) to initiate download of the low-resolution of $I_x$.

An alternative arrangement is similar to the preferred arrangement already described, except that the images are partitioned to produce a low-resolution version, medium-delta-resolution version and high-delta-resolution version that do not overlap with one another. The low-resolution version can be decoded on its own right but not the remaining two versions. The medium resolution can be obtained by combining the low-resolution version and the medium-delta-resolution version. Additionally, the alternative arrangement requires the image retrieving process to be adapted to always retrieve the low-resolution version before the remaining versions and the medium-delta-resolution version before the high-delta-resolution version. Each version is retrieved based on demand. The alternative arrangement has the potential to improve data availability by decreasing the storage requirements of the system. It is most suited for systems where peers have higher relative availability.

Figure 16:
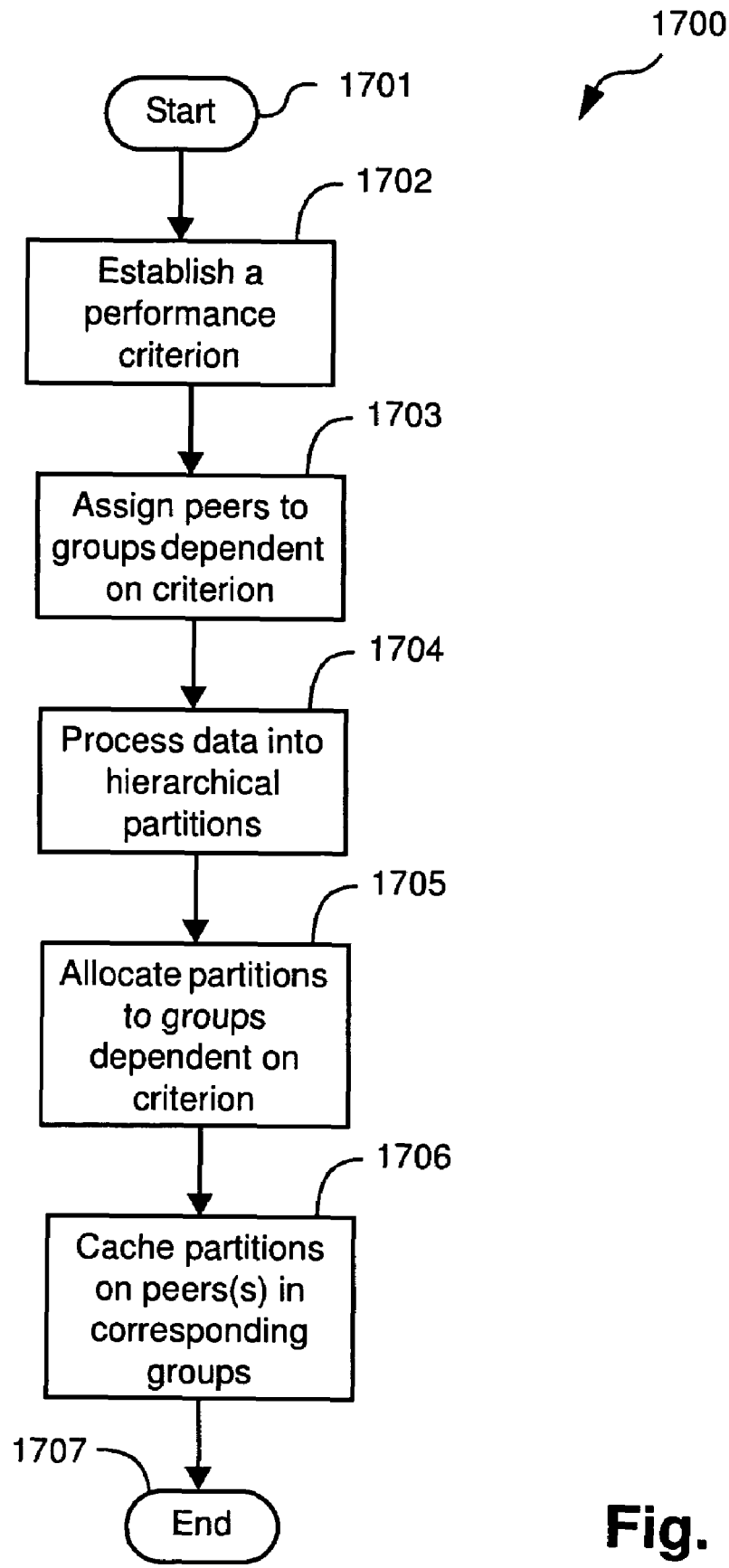
FIG. 16 is a process showing how data is cached in the system

FIG. 16 is a process showing how data is cached in the system. The process commences with a start step 1701 after which a step 1702 establishes a performance criterion. A following step 1703 assigns peers to groups dependent upon the criterion. A subsequent step 1704 processes the data into hierarchical partitions. Thereafter a step 1705 allocates the partitions to groups dependent upon the criterion, after which a step 1706 caches the data in one or more peers in corresponding groups. The process 1700 terminates with an END step 1707.

INDUSTRIAL APPLICABILITY

It is apparent from the above that the arrangements described are applicable to the data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A method for caching data in a hybrid peer-to-peer system comprising a plurality of interconnected peer computers, the method comprising the steps of:
   (a) establishing a performance criterion;
   (b) arranging the hybrid peer-to-peer system as a plurality of interconnected hierarchical groups of peers by (c) assigning each of the plurality of peers to at least one group as a first function of the performance criterion;

(d) processing the data into a plurality of hierarchical data partitions;

(e) allocating, as a second function of the performance criterion, each said data partition to at least one of the groups; and (f) caching each said data partition in at least one peer in the corresponding group.

2. A method according to claim 1, wherein the performance criterion includes optimization of one or more of:
data availability;
data survivability;
data throughput; and
data security.

3. A method according to claim 1, wherein:
the performance criterion is functionally dependent upon at least one factor; and
the arranging step is performed as a function of the at least one factor.

4. A method according to claim 3, wherein the performance criterion is maximum data availability, and the at least one factor is allocated bandwidth and availability.

5. A method according to claim 1, wherein the arranging step is performed at least at one of a network logical layer and a network physical layer.

6. A method according to claim 1, wherein:
the group at the top of the hierarchy comprises a central server with which each other one of said plurality of peers can communicate directly; and wherein:
the assigning step, in relation to a current peer wishing to join said system, comprises the steps of:
(i) establishing a hierarchical rank for the current peer; and
(ii) assigning the current peer to a corresponding hierarchical group dependent upon said rank.

7. A method according to claim 6, wherein the hierarchical rank is dependent upon at least one of a relative availability and a relative throughput of the current peer.

8. A method according to claim 7, wherein at least one peer having a particular hierarchical rank is assigned in the assigning step to a hierarchical group at a lower hierarchic level.

9. A method according to claim 8, further comprising the steps of:
(g) the central server amending the structure of the system as peer membership changes by performing at least one of:
(h) moving a peer from a currently assigned hierarchical group to another hierarchical group as the peer characteristics change beyond a deviation margin; and
(j) allocating a role of one peer to another peer when the one peer disconnects from the system.

10. A method according to claim 1, wherein at least one of the data partitions preserves semantic content of the data.

11. A method according to claim 1, wherein said caching of said each data partition is performed one of (i) concurrently, (ii) distributed across a short time interval, and (iii) distributed across a long time interval.

12. A method according to claim 1, wherein:
the data comprises an image; and
the processing in 1(d) step forms partitions on a resolution basis.

13. A method according to claim 1, wherein:
the data comprises video information; and
the processing step forms clip-based partitions on the basis of at least one of time sequencing and clip content.

14. A method according to claim 1, wherein:
the data comprises audio information; and
the processing step forms partitions on the basis of at least one of frequency, range and bit rate.

15. A method by which a sharing peer shares images with a plurality of recipient peers in a hybrid peer-to-peer system, the method comprising the steps of:
(a) caching, by the sharing peer, images for sharing according to the method in claim 1, the images being partitioned at a perceptual level; and
(b) notifying the recipient peers that the images are available, the notification providing information necessary to retrieve the images.

16. A distributed hybrid peer-to-peer system for distributed data caching, the system comprising a plurality of interconnected peer computers having been arranged by (a) establishing a performance criterion, (b) arranging the hybrid peer-to-peer system as a plurality of interconnected hierarchical groups of peers by (c) assigning each of the plurality of peers to at least one group as a first function of the performance criterion, the system comprising:
(d) means for processing the data into a plurality of hierarchical data partitions;
(e) means for allocating, as a second function of the performance criterion, each said data partition to at least one of the groups; and
(f) means for caching each said data partition in at least one peer in the corresponding group.

17. A system according to claim 16, wherein the arrangement of the computer system is performed at least at one of a network logical layer and a network physical layer.

18. A computer readable storage medium having recorded thereon a computer program for directing a processor to execute procedures for caching data in a hybrid peer-to-peer system comprising a plurality of interconnected peer computers, the program comprising instructions to execute:
(a) establishing a performance criterion;
(b) arranging the hybrid peer-to-peer system as a plurality of interconnected hierarchical groups of peers, by (c) assigning each of the plurality of peers to at least one group as a first function of the performance criterion;
(d) processing the data into a plurality of hierarchical data partitions;
(e) allocating, as a second function of the performance criterion, each said data partition to at least one of the groups; and
(f) caching each said data partition in at least one peer in the corresponding group.

* * * * *